US011863718B2

(12) United States Patent
Maruyama

(10) Patent No.: US 11,863,718 B2
(45) Date of Patent: Jan. 2, 2024

(54) INFORMATION PROCESSING APPARATUS AND NON-TRANSITORY COMPUTER READABLE MEDIUM STORING PROGRAM

(71) Applicant: FUJIFILM Business Innovation Corp., Tokyo (JP)

(72) Inventor: Atsushi Maruyama, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 593 days.

(21) Appl. No.: 16/856,001

(22) Filed: Apr. 22, 2020

(65) Prior Publication Data
US 2021/0105376 A1    Apr. 8, 2021

(30) Foreign Application Priority Data

Oct. 7, 2019   (JP) ................................. 2019-184606

(51) Int. Cl.
*G06F 3/048*     (2013.01)
*H04N 1/00*      (2006.01)

(52) U.S. Cl.
CPC ..... *H04N 1/00474* (2013.01); *H04N 1/00427* (2013.01); *H04N 1/00432* (2013.01)

(58) Field of Classification Search
CPC ........... H04N 1/00474; H04N 1/00427; H04N 1/00432
See application file for complete search history.

(56) References Cited

U.S. PATENT DOCUMENTS

| | | | |
|---|---|---|---|
| 5,442,541 A  * | 8/1995  | Hube | G03G 15/502 |
| | | | 399/42 |
| 8,504,519 B1 | 8/2013 | Sachs et al. | |
| 8,996,457 B2 | 3/2015 | Sachs et al. | |
| 9,348,836 B2 | 5/2016 | Sachs et al. | |
| 10,795,546 B2 * | 10/2020 | Yoshida | H04N 1/00437 |
| 11,455,127 B2 * | 9/2022 | Nakajima | G06F 3/1267 |

(Continued)

FOREIGN PATENT DOCUMENTS

| | | |
|---|---|---|
| JP | H08235231 | 9/1996 |
| JP | 2015527646 | 9/2015 |

OTHER PUBLICATIONS

Shogo Nakajima., "Remote control of another computer via the net Applicable to help desk and mobile applications", Nikkei Windows Pro, with English translation thereof, Feb. 1, 2023, pp. 1-8.

(Continued)

*Primary Examiner* — David Phantana-angkool
(74) *Attorney, Agent, or Firm* — JCIPRNET

(57) ABSTRACT

An information processing apparatus includes: a processor configured to perform communication with another apparatus to receive a change in a function of processing data performed in the other apparatus; cause the change to be reflected in the function of the information processing apparatus; execute a process related to a first function of the information processing apparatus on first data in accordance with an instruction from a user, during a period in which communication with the other apparatus is not performed; and display information for specifying the first data in a case where a change in the first function is received from the other apparatus when communication with the other apparatus is performed after executing the process related to the first function on the first data.

18 Claims, 17 Drawing Sheets

(56) References Cited

U.S. PATENT DOCUMENTS

| | | | | |
|---|---|---|---|---|
| 11,533,406 | B2* | 12/2022 | Watariuchi | H04N 1/00424 |
| 2003/0020760 | A1* | 1/2003 | Takatsu | G03G 15/5016 |
| | | | | 715/810 |
| 2004/0021698 | A1* | 2/2004 | Baldwin | G06F 3/0488 |
| | | | | 345/173 |
| 2005/0286090 | A1* | 12/2005 | Ahne | H04N 1/32379 |
| | | | | 358/452 |
| 2007/0247641 | A1* | 10/2007 | Okuma | G06F 3/04817 |
| | | | | 358/1.1 |
| 2014/0149914 | A1* | 5/2014 | Yoshida | H04N 1/0035 |
| | | | | 715/772 |
| 2020/0159479 | A1* | 5/2020 | Yoshida | G06F 3/1208 |
| 2020/0296238 | A1* | 9/2020 | Nishiyama | H04N 1/00503 |
| 2021/0058524 | A1* | 2/2021 | Kasahara | G06F 3/1238 |
| 2021/0092245 | A1* | 3/2021 | Watariuchi | H04N 1/00395 |
| 2021/0182006 | A1* | 6/2021 | Yoshida | H04N 1/00477 |
| 2022/0094799 | A1* | 3/2022 | Chiba | H04N 1/00424 |
| 2022/0239791 | A1* | 7/2022 | Samo | H04N 1/0097 |

OTHER PUBLICATIONS

Office Action of Japan Counterpart Application, with English translation thereof, dated May 30, 2023, pp. 1-6.

* cited by examiner

FIG. 5

| BUTTON ID | EDITING AVAILABILITY | LAST UPDATE DATE AND TIME |
|---|---|---|
| A | YES | 07/26/2019 14:10 |
| B | NO | 07/12/2019 10:21 |
| ⋮ | ⋮ | ⋮ |

FIG. 6

| BAR ID | BAR DEFINITION | LAST UPDATE DATE AND TIME |
|---|---|---|
| 1 | A→B→C | 07/26/2019 14:10 |
| 2 | D→C→E→F | 07/11/2019 15:10 |
| ⋮ | ⋮ | ⋮ |

FIG. 7

| JOB ID | BAR ID | BUTTON ID | DOCUMENT ID |
|---|---|---|---|
| 0001 | 1 | A | Doc1 |
| 0001 | 1 | B | Doc1 |
| 0001 | 1 | C | Doc1 |
| ⋮ | ⋮ | ⋮ | ⋮ |

FIG. 14

| BUTTON ID | EDITING AVAILABILITY | AUTOMATIC EXECUTION VALIDITY | LAST UPDATE DATE AND TIME |
|---|---|---|---|
| A | YES | VALID | 07/26/2019 14:10 |
| B | NO | INVALID | 07/12/2019 10:21 |
| ⋮ | ⋮ | ⋮ | ⋮ |

FIG. 17

| No | 1 | 2 | 3 | 4 |
|---|---|---|---|---|
| BUTTON IMAGE | SCAN ESTIMATE | PRESS APPROVAL MARK | BIND WITH CATALOG | APPLY SECURITY... |
| CHANGE HISTORY | NO CHANGE | ADDED | NO CHANGE | NO CHANGE |
| AUTOMATIC EXECUTION | UNNECESSARY | AUTOMATICALLY EXECUTED | AUTOMATICALLY EXECUTED | AUTOMATICALLY EXECUTED |

FIG. 19

| No | 1 | 2 | 3 | 4 |
|---|---|---|---|---|
| BUTTON IMAGE | SCAN ESTIMATE | PRESS APPROVAL MARK | BIND WITH CATALOG | APPLY SECURITY... |
| CHANGE HISTORY | NO CHANGE | ADDED | NO CHANGE | NO CHANGE |
| AUTOMATIC EXECUTION | UNNECESSARY | AUTOMATICALLY EXECUTED | AUTOMATICALLY EXECUTED | NEED TO BE MANUALLY EXECUTED |

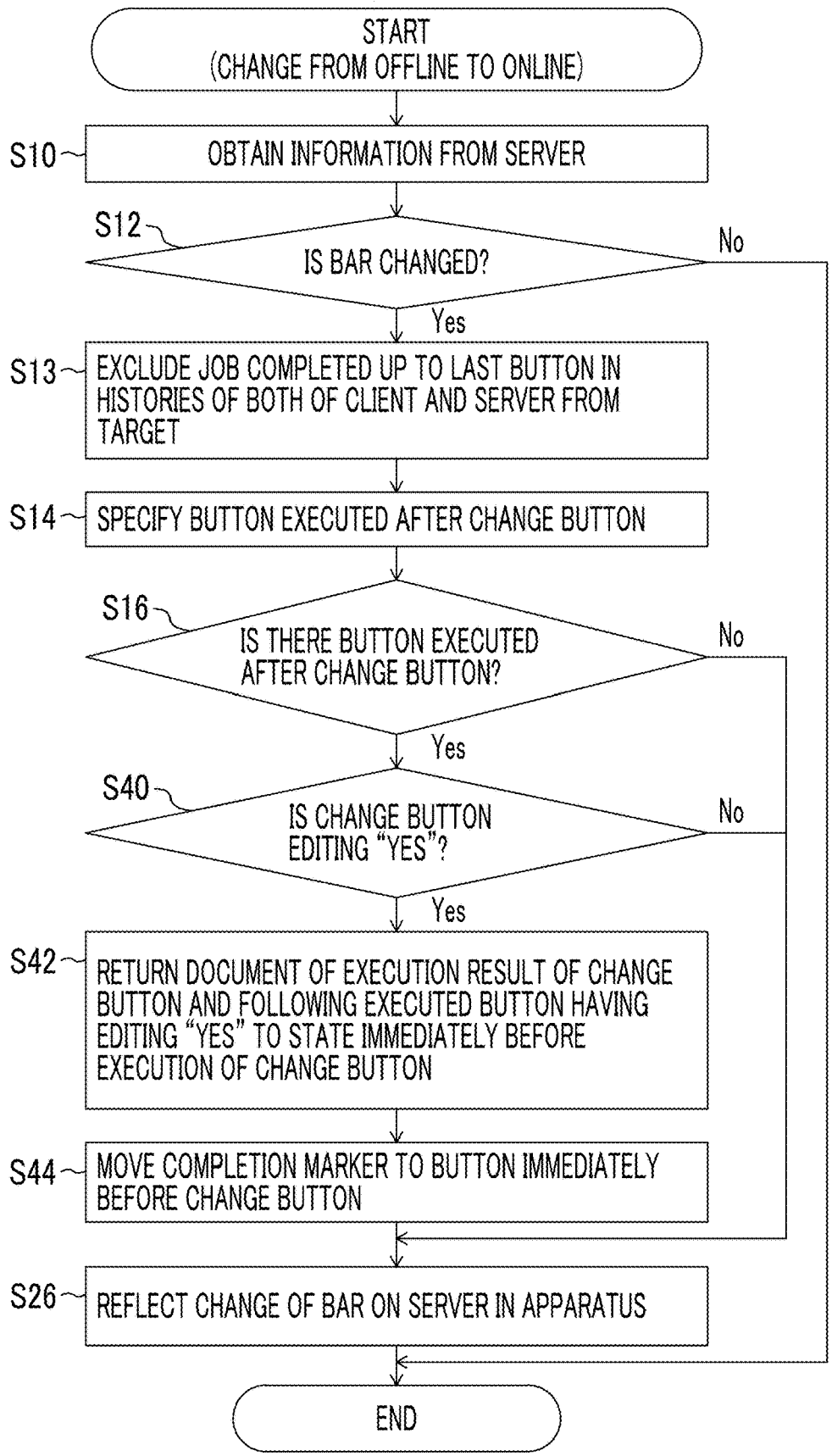

INFORMATION PROCESSING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2019-184606 filed Oct. 7, 2019.

BACKGROUND

(i) Technical Field

The present invention relates to an information processing apparatus and a non-transitory computer readable medium storing a program.

(ii) Related Art

Among some systems which handle data such as documents, there is a system which provides a bar indicating a type of workflow in which graphical user interface (GUI) components such as buttons for calling commands executable on the data are arranged, to a user. The user can work in accordance with the workflow by sequentially pressing the buttons arranged in the bar.

Further, such a bar is shared by a plurality of user terminals via a server. For example, in a case where a user or an administrator who shares a bar makes a change, such as adding a button, to the bar, the change is registered in the server, and each user terminal sharing the bar obtains and uses the toolbar after the change, from the server.

An example of such a bar is Docuworks (registered trademark) "work bar" provided by the applicant.

In some systems of this type, an application of a user terminal can execute a process on data by using a bar not only when the application is in an online state with the server but also in a case where the application is in an offline state with the server.

In this manner, in a case where a function such as a command or a bar for executing a process on data of an apparatus is changed by another apparatus, the change is received by communicating with the other apparatus and reflected in the function of the apparatus. The function in the apparatus can be executed even while not communicating with the other apparatus.

Further, in a system described in JP2015-527646A, a server stores a plurality of files, and manages synchronization of the plurality of files across client devices in accordance with a user preference implemented in a change management rule. A first version of the file is designated to be synchronized across at least a first client or a second client. The first client accesses the first version of the file to create a first modified version of the file, and the second client accesses a second version of the file to create a second modified version of the file. In a case where the first client and the second client attempt to resynchronize the respective modified versions of the file, the server determines an appropriate version from the available modified versions of the file in accordance with the change management rule. Next, the appropriate version is stored by the server and then is provided for synchronization across a plurality of client devices.

In a system disclosed in JP1996-235231A, an operator converts standard design data to be designed stored in a shared database into a data expression format unique to design data editing means by design data expression format conversion means, and edits the data. In a case where a review support system detects a change request for the standard design data, communication control means generates a review message including the change request and the review message is delivered to another operator by communication means. At this time, change request notification means determines the other operator to be delivered and a delivery timing. The delivered review message is sorted and stored for each change request location by review history collection means, and the operator evaluates and selects an appropriate change request among the change requests, and reflects the change request in the design data.

SUMMARY

When a process related to a function in an apparatus is executed on data while not communicating with another apparatus, and in a case where a change is performed on the function in the other apparatus during that time, the process result of the data in the apparatus does not correspond to the change of the function. In order to match the process result of the data with the function after the change, it is necessary to specify the data in the apparatus. For this purpose, a user needs to remember which data is processed by the changed function while the apparatus does not communicate with the other apparatus.

Aspects of non-limiting embodiments of the present disclosure relate to an information processing apparatus and a non-transitory computer readable medium storing a program that reduce, in a case where a process related to a function in an apparatus is executed on data while not communicating with another apparatus and a change is performed on the function by the other apparatus during that time, as compared with a case where the apparatus does not specify the data, a trouble of specifying the data by a user.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including: a processor configured to perform communication with another apparatus to receive a change in a function of processing data performed in the other apparatus; cause the change to be reflected in the function of the information processing apparatus; execute a process related to a first function of the information processing apparatus on first data in accordance with an instruction from a user, during a period in which communication with the other apparatus is not performed; and display information for specifying the first data in a case where a change in the first function is received from the other apparatus when communication with the other apparatus is performed after executing the process related to the first function on the first data.

BRIEF DESCRIPTION OF THE DRAWINGS

Exemplary embodiment(s) of the present invention will be described in detail based on the following figures, wherein:

FIG. 5 is a diagram illustrating button management information;

FIG. 6 is a diagram illustrating bar management information;

FIG. 7 is a diagram illustrating an example of history information;

FIG. 14 is a diagram illustrating button management information including an automatic execution validity attribute;

FIG. 17 is a diagram illustrating display contents of a detail screen called from the screen illustrated in FIG. 16;

FIG. 19 is a diagram illustrating display contents of a detail screen called from the screen illustrated in FIG. 18; and FIG. 20 is a diagram illustrating another example of the processing procedure of returning the document affected by the change in the flow bar during the offline period to the appropriate state.

DETAILED DESCRIPTION

Figure 1:
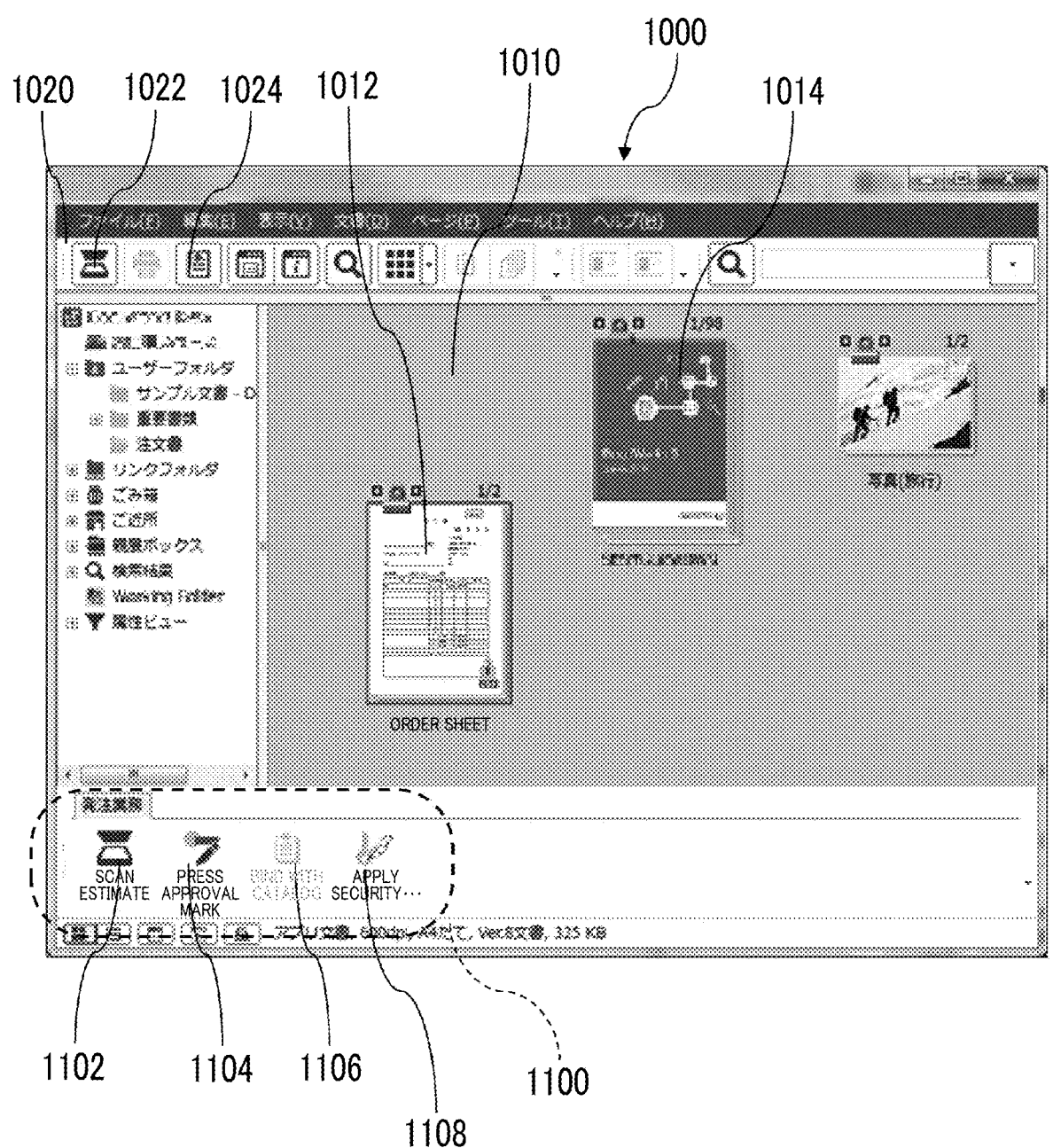
FIG. 1 illustrates an example of a UI screen of a document handling application using a flow bar.

With reference to FIG. 1, a flow bar 1100 which is an example of a function of performing processes on data will be described. FIG. 1 illustrates a window 1000 provided by a document handling application executed on a client operated by a user. In a main pane 1010 of the window 1000, icons 1012 and 1014 of a document file (hereinafter, simply referred to as a document) as an example of data which can be processed by the flow bar 1100 are arranged. The main pane 1010 is a metaphor for a user's work place, for example, on a desk, and the individual icons 1012 and 1014 represent individual documents in the work place. On the toolbar 1020, buttons 1022, 1024, and the like representing commands, which are another example of functions executable for a document, are arranged.

The user selects a document to be processed by selecting the icon 1012 or the 1014 by a mouse click operation or the like. For example, in a case where the user performs an operation of pressing the button 1022 on the toolbar 1020, a process of a command corresponding to the button 1022 is executed on the document.

The command to be executed on the document can be selected from a pull-down menu displayed by selecting a menu such as "file" or "edit" in a menu bar on the window 1000 in addition to the buttons on the toolbar 1020.

Commands which can be executed by the document handling application include, for example, a scan command of capturing a document of a scan result from a scanner, a display command of displaying document contents, and an annotation command of adding an annotation to the document. In some annotations, an image representing an imprint such as a user's approval mark at a predetermined location in a document is added. Further, among such commands, there are a "division" command of dividing a document into a plurality of documents in page units, a "binding" command of combining pages of a plurality of documents into one document conversely, and a security command of performing encryption or access right setting on documents.

The flow bar 1100 is a bar representing a workflow of a task performed by the user using this application. In the flow bar 1100, buttons 1102 to 1108 representing individual commands constituting the workflow are arranged in accordance with an order in the workflow. The individual buttons 1102 to 1108 in the flow bar 1100 correspond to commands which can be called from the toolbar 1020 or the menu bar. It is also possible to customize appearance of the buttons 1102 to 1108 and setting contents of the corresponding commands unique to the user. For example, the button 1102 is associated with a scan command, and an image representing the button 1102 includes a customized wording of "scan estimate". The button 1104 is associated with the annotation command, and an image of an imprint of the user's approval mark is set as contents of the annotation.

In a case of executing a workflow represented by the flow bar 1100, the user first sets an estimate on the scanner, and presses the button 1102 in the lead. As a result, the scanner scans the estimate, and a document obtained as a result of the scan is loaded into the document handling application. The icon 1012 of the captured document is displayed in the main pane 1010. Next, in a case where the user selects the icon 1012 and presses the button 1104, an approval mark is pressed on the document (that is, the estimate) indicated by the icon 1012. Next, the user presses the button 1106 (having a name of "bind with catalog") to bind a document file of a product catalog separately scanned and taken into the main pane 1010 for the estimate indicated by the icon 1012. As a result, an icon of one document in which the estimate and the catalog are bound is formed on the main pane 1010. Next, the user selects an icon of the document and presses the button 1108 (having a name "apply security") to perform a security process such as a setting of a predetermined access right (for example, prohibition of editing) and the like on the document.

Here, all buttons 1102 to 1108 in the flow bar 1100 are described as being pressed by one user, but this is only an example. Alternatively, a workflow can be provided by a plurality of person so that a plurality of users who share the identical flow bar 1100 press the buttons 1102 to 1108 corresponding to respective roles. In this case, for example, a specific folder on the server is associated with the flow bar 1100, and the folder is synchronized with the specific folder in the user's client. On the main pane 1010 of the client operated by each user, the icon 1012 or the like of a document group in a specific folder in the client synchronized with the folder on the server corresponding to the flow bar 1100 are displayed.

The flow bar 1100 performs a series of processes indicated by a sequence of commands indicated by the buttons 1102 to 1108 included in the flow bar 1100 on data of one or more target documents or the like. That is, the flow bar 1100 represents a "function of processing data". In a case where the flow bar 1100 is regarded as one "function", the commands indicated by the individual buttons 1102 to 1108 included in the flow bar 1100 can be regarded as "partial functions" constituting the "function".

As described above, the flow bar 1100 can be shared between the plurality of users. In some cases, the flow bar 1100 shared by the plurality of users are changed by any one of the plurality of users or by another user (for example, a system administrator) who has editing rights of the flow bar 1100. The change of the flow bar 1100 includes, for example, addition of a new button (that is, a command), deletion of an existing button, change of setting contents of a command corresponding to the existing button, and the like.

In a case where a user changes the flow bar 1100 on a client operated by the user, contents of the change are reflected on a server as soon as the client can communicate with the server. For example, in a case where the user changes the flow bar 1100 on the client which is in an online state (that is, a communication enabled state) with the server, the change is immediately reflected in management information of the flow bar 1100 on the server. The changed flow bar 1100 reflected on the server is reflected on the client of each user who shares the flow bar 1100 as soon as the client can communicate with the server.

When a client of a user who shares the flow bar 1100 is in an offline state (that is, a communication disabled state) with the server, the flow bar 1100 on the server may be changed. In that case, the client accepts an instruction from the user by using the flow bar 1100 before the change until the client is in the online state with the server again.

In a case where a workflow of one job is executed by using the flow bar 1100, commands indicated by individual buttons in the flow bar 1100 may be executed by different users who share the flow bar 1100.

Figure 2:
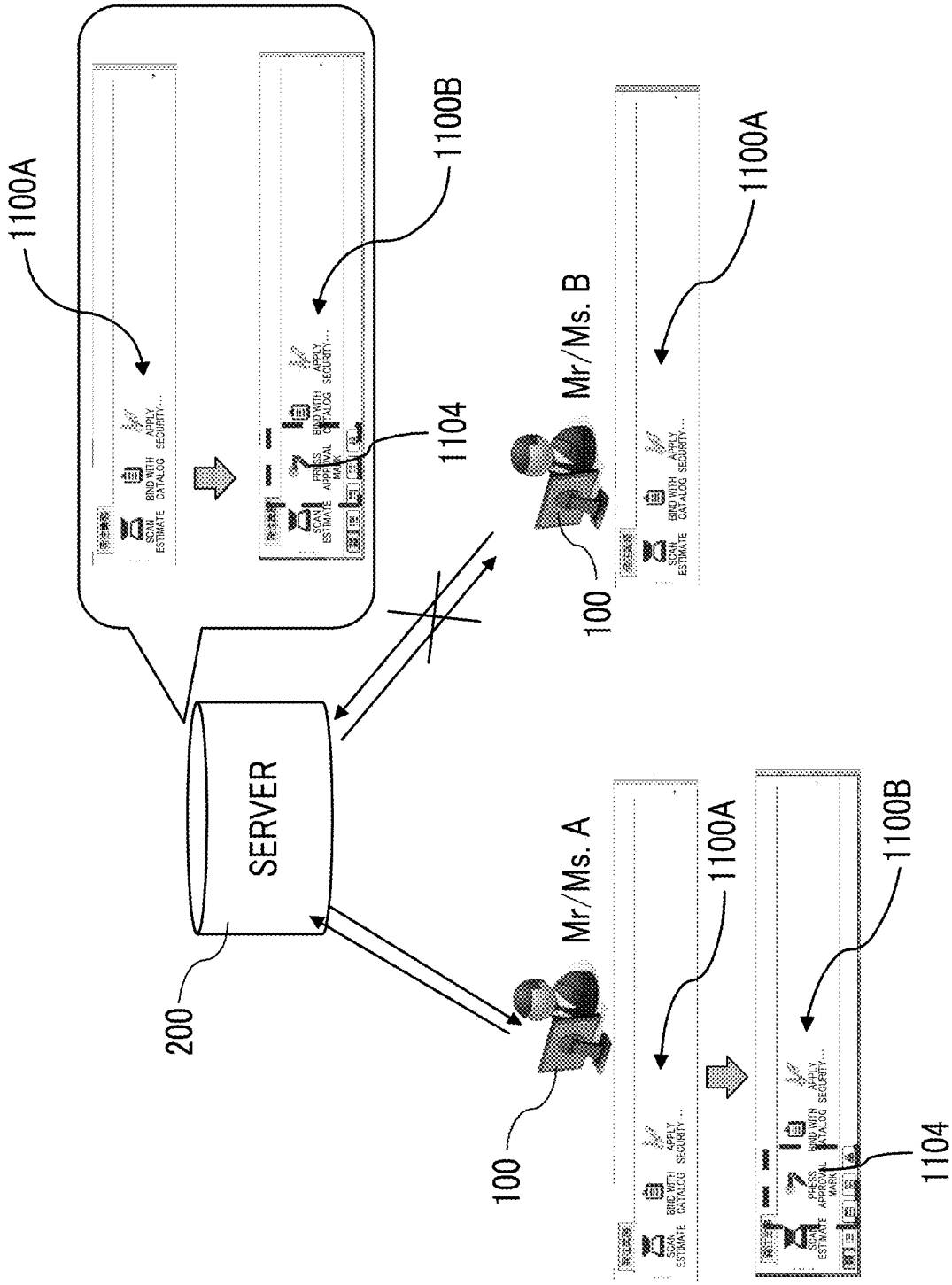
FIG. 2 is a diagram illustrating a mode in which a change is performed on a flow bar shared by a plurality of users when a certain user is in an offline state with a server.

In the example illustrated in FIG. 2, a flow bar 1100A on a server 200 is changed to a flow bar 1100B by adding the button 1104 at one point. Since a client 100 of a user "Mr/Ms. A" is in an online state with the server 200 at the time of the change, the client 100 immediately follows the change and displays the changed flow bar 1100B in the window 1000. On the other hand, since the client 100 of a user "Mr/Ms. B" is in an offline state with the server 200 at the time of the change, the client 100 receives an instruction from the "Mr/Ms. B" by using the flow bar 1100A before the change.

In this manner, when the flow bar 1100 on the server 200 is changed, the client 100 which is in an offline state with the server 200 proceeds with the process by using the flow bar 1100 before the change, in some cases. A document resulting from the process performed by using the flow bar 1100 before the change may not conform to a workflow represented by the flow bar 1100 after the change. For example, in the example in FIG. 2, it is assumed that the "Mr/Ms. B" proceeds with the work to the last button 1108 (this indicates a command of "apply security") of the flow bar 1100A before the change by using the client 100 which is in at offline state with the server 200. Meanwhile, in a case where this operation is performed, the flow bar 1100A is already changed to the flow bar 1100B on the server 200. Since a document of the work result of "Mr/Ms. B" is not processed by the button 1104 included in the correct flow bar 1100B on the server 200, the document is in a state in which an approval mark is not stamped. This document is ineligible for the workflow indicated by the changed flow bar 1100B.

Thereafter, when the client 100 of "Mr/Ms. B" is in the online state with the server 200, the flow bar 1100A on the client 100 is changed to the flow bar 1100B in synchronization with the server 200. At this time, since the document processed by using the flow bar 1100A before the change during the offline period does not fit the new workflow as it is, it is necessary to undo the editing performed on the document. For this purpose, the "Mr/Ms. B" needs to search for a document processed during the offline period from the documents indicated by the icons 1012 and 1014 in the main pane 1010, which is troublesome. Therefore, in the present exemplary embodiment, the document processed during the offline period is notified to the "Mr/Ms. B". The offline period refers to a period in which the client 100 is in an offline state with the server 200.

Example of Hardware Configuration

A hardware configuration of the client 100 which executes a document handling application will be described.

Figure 3:
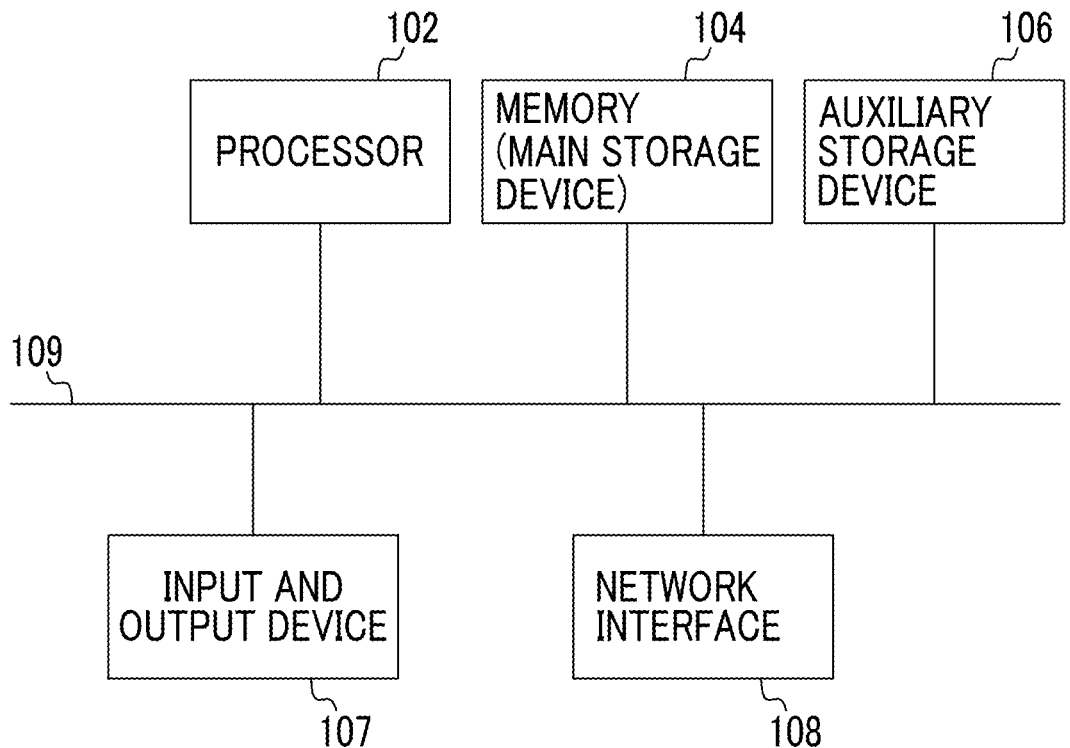
FIG. 3 is a diagram illustrating a hardware configuration of a client.

The client 100 is a type of computer, and has a circuit configuration in which, as illustrated in FIG. 3, for example, as a hardware, a controller which controls a processor 102, a memory (main storage device) 104 such as a random access memory (RAM), a flash memory or a solid state drive (SSD), and an auxiliary storage device 106 such as a hard disk drive (HDD), an interface with various input and output devices 107, a network interface 108 which controls connection with a network such as a local area network, and the like are connected via a data transmission line such as a bus 109, for example. The document handling application is installed in a computer via a network or the like, and is stored in the auxiliary storage device 106. The processor 102 executes the application stored in the auxiliary storage device 106 by using the memory 104, so that each function of the application is realized.

In the embodiments above, the term "processor" in the processor 102 refers to hardware in a broad sense. Examples of the processor includes general processors (e.g., CPU: Central Processing Unit), dedicated processors (e.g., GPU: Graphics Processing Unit, ASIC: Application Specific Integrated Circuit, FPGA: Field Programmable Gate Array, and programmable logic device).

In the embodiments above, the term "processor" in the processor 102 is broad enough to encompass one processor 102 or plural processors 102 in collaboration which are located physically apart from each other but may work cooperatively. The order of operations of the processor is not limited to one described in the embodiments above, and may be changed.

The server 200 is also configured based on a computer in the same manner as the client 100.

Example of Management Information Related to Flow Bar

Figure 4:
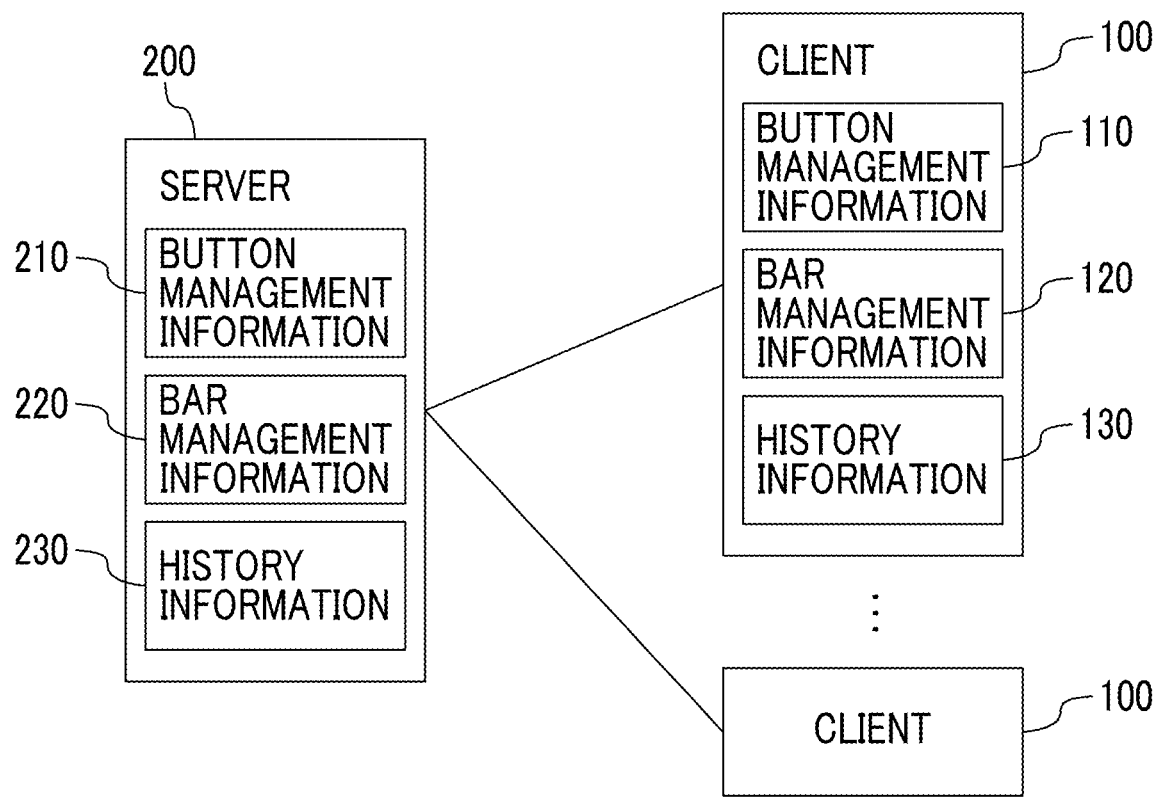
FIG. 4 is a diagram illustrating a group of information held by a server and a client.

As illustrated in FIG. 4, the client 100 and the server 200 hold button management information 110 and 210, bar management information 120 and 220, and history information 130 and 230 for a service related to the flow bar 1100 described above.

The button management information 110 and 210 are management information on the individual buttons 1102 to 1108 included in the flow bar 1100. As illustrated in FIG. 5, the button management information 110 and 210 include respective attribute items of a button ID, editing availability, and a last update date and time.

The "button ID" is identification information for uniquely identifying each of the buttons 1102 to 1108. The server 200 manages information on the various flow bars 1100 used by various users. The button ID is uniquely assigned to each button in the various flow bars 1100. Although not illustrated, a set of a command and a setting content indicated by a button is stored in the client 100 and the server 200 in association with a button ID of the button. Out of the command and the setting content, the setting content is customized for each user or each group of users who share the button.

An attribute of "editing availability" of the button management information 110 and 210 indicates whether or not there is a possibility that a target document is edited in a case where the button is pressed. Here, editing of a document refers to a process of changing contents of the document, a specific attribute of the document, or a data format of the document.

Here, the editing of the content of the document includes editing of contents of a document body and editing of an annotation added to the document body. The editing of the document body includes addition, deletion, or change of description in the document body. Further, a process of dividing a document into a plurality of parts in page units and a process of binding a plurality of documents into one are included in the concept of editing the document body. The editing of the annotation includes adding the annotation to the document body, deleting the annotation added to the document body, or changing the annotation added to the document body.

For example, the button 1104 of "press approval mark" indicates a process of adding an annotation indicating an image of an approval mark to a document, and changes contents of an appearance of the document. Therefore, a value of the attribute of "editing availability" for the button 1104 is "yes".

The button 1106 of "bind with catalog" is a process of binding a scanned document (for example, an order sheet) to a document of the corresponding catalog into one document, and a value of the attribute of "editing availability" of the button 1106 is "yes".

Further, a process executed by a command corresponding to the button 1108 of "apply security" includes a process of adding an operation prohibition attribute for inhibiting a preset operation to the document. For example, various items such as whether or not to prohibit editing of contents of a document, whether or not to prohibit the editing of an annotation added to the document, whether or not to prohibit printing, and whether or not to prohibit to transfer the content and the annotation of the document to another document can be set to the button 1108. The process indicated by the button 1108 is for changing the operation prohibition attribute, which is an example of a specific attribute of the document, and is a form of editing for the document. Accordingly, a value of the attribute "editing availability" of the button 1108 is "yes".

In addition, such as a button of "save in PDF format", a value of the attribute of "editing availability" of a button indicating a process of changing the data format of the document is "yes".

On the other hand, since a button for displaying a memo or a manual prepared in advance for a target document does not change contents, attributes, and the like of the document, a value of the attribute of "editing availability" is "no".

An attribute of "last update date and time" of the button management information 110 and 210 indicates a date and time in a case where a process content or a setting content of a command corresponding to the button is lastly updated.

The bar management information 120 and 220 are management information of the flow bar 1100. As illustrated in FIG. 6, the bar management information 120 and 220 include respective attribute items of a bar ID, a bar definition, and a last update date and time.

The "Bar ID" is identification information for uniquely identifying the flow bar 1100. The "bar definition" is information indicating a workflow represented by the flow bar 1100, that is, an arrangement of button IDs of buttons constituting the flow bar 1100. For example, a flow bar having a bar ID "1" in the illustrated example represents the flow bar 1100 in which buttons A, B, and C are arranged in this order. The "last update date and time" indicates a date and time in a case where a bar definition of the flow bar 1100 is lastly updated.

For example, in a case where a certain user changes setting contents of a command corresponding to a certain button included in a certain flow bar, a last update date and time of the button in the button management information 110 and 210 is changed to a date and time in a case where the change is performed. In this case, a last update date and time of a flow bar including the button in the bar management information 120 and 220 is also changed to the date and time in a case where the change is performed.

Further, for example, in a case where a certain user adds a button to a certain flow bar, the last update date and time of the flow bar in the bar management information 120 and 220 is changed to a date and time in a case where the addition is performed. At this time, information on the added button is registered in the button management information 110 and 210. Further, for example, in a case where a certain user deletes a button from a certain flow bar, the last update date and time of the flow bar in the bar management information 120 and 220 is changed to a date and time in a case where the deletion is performed.

The button management information 110 and the bar management information 120 in the client 100 are synchronized with the button management information 210 and the bar management information 220 in the server 200. Meanwhile, when the button management information 210 or the bar management information 220 in the server 200 is changed, the button management information 110 and the bar management information 120 in the client 100 which is in an offline state with the server 200 remain as old information until the information is now in an online state with the server 200.

The history information 130 and 230 are information indicating a history of a user who uses the flow bar 1100. Each record of the history information 130 and 230 includes a job ID, a bar ID, a button ID, and a document ID as illustrated in FIG. 7.

The job ID is identification information for uniquely identifying a job executed by using the flow bar 1100 (that is, one specific workflow). As the job ID, for example, a serial number assigned in the order in which jobs are generated may be used. In this case, in a case where a certain user presses a first button in a sequence of buttons in the flow bar 1100, a new job using the flow bar 1100 is started, and a job ID of the job is numbered.

The bar ID in the record in FIG. 7 is a bar ID of the flow bar 1100 used in the job. In addition, the button ID is a button ID of the button pressed in a case where the record is generated in the flow bar 1100 indicated by the bar ID.

Further, the document ID is identification information of a document generated as a process result of a command executed by pressing the button. The document ID of one document is maintained even in a case where contents of the document are changed by executing the command corresponding to the pressed button.

As described above, records of the history information 130 and 230 are generated each time the button of the flow bar 1100 is pressed. The records in the history information 130 and 230 are arranged in the order in which a group of records is generated. Although not necessary in principle, each record may include a time at a case where the button corresponding to the record is pressed (or an execution time of the command corresponding to the button).

The record of the button pressed on the client 100 is added to the history information 130 in the client 100. In addition, the record is transmitted to the server 200 as soon as the client 100 is in an online state with the server 200, and is added to the history information 230 in the server 200. Therefore, in a case where the client 100 is in the online state with the server 200 when the button is pressed on the client 100, the record of the history corresponding to the button press is immediately recorded in the server 200. Meanwhile, when the client 100 is in an offline state with the server 200 when the button is pressed on the client 100, the record of the button press history is recorded only on the client 100 at that time, and is not reflected on the server 200.

In a case where an icon of a document is selected on the main pane 1010 in the window 1000 illustrated in FIG. 1, the processor 102 may specify a record including an ID of the document from the history information 130, and may display the flow bar 1100 corresponding to a bar ID included in the record.

Process of Notifying of Document Processed During Offline

Figure 8:
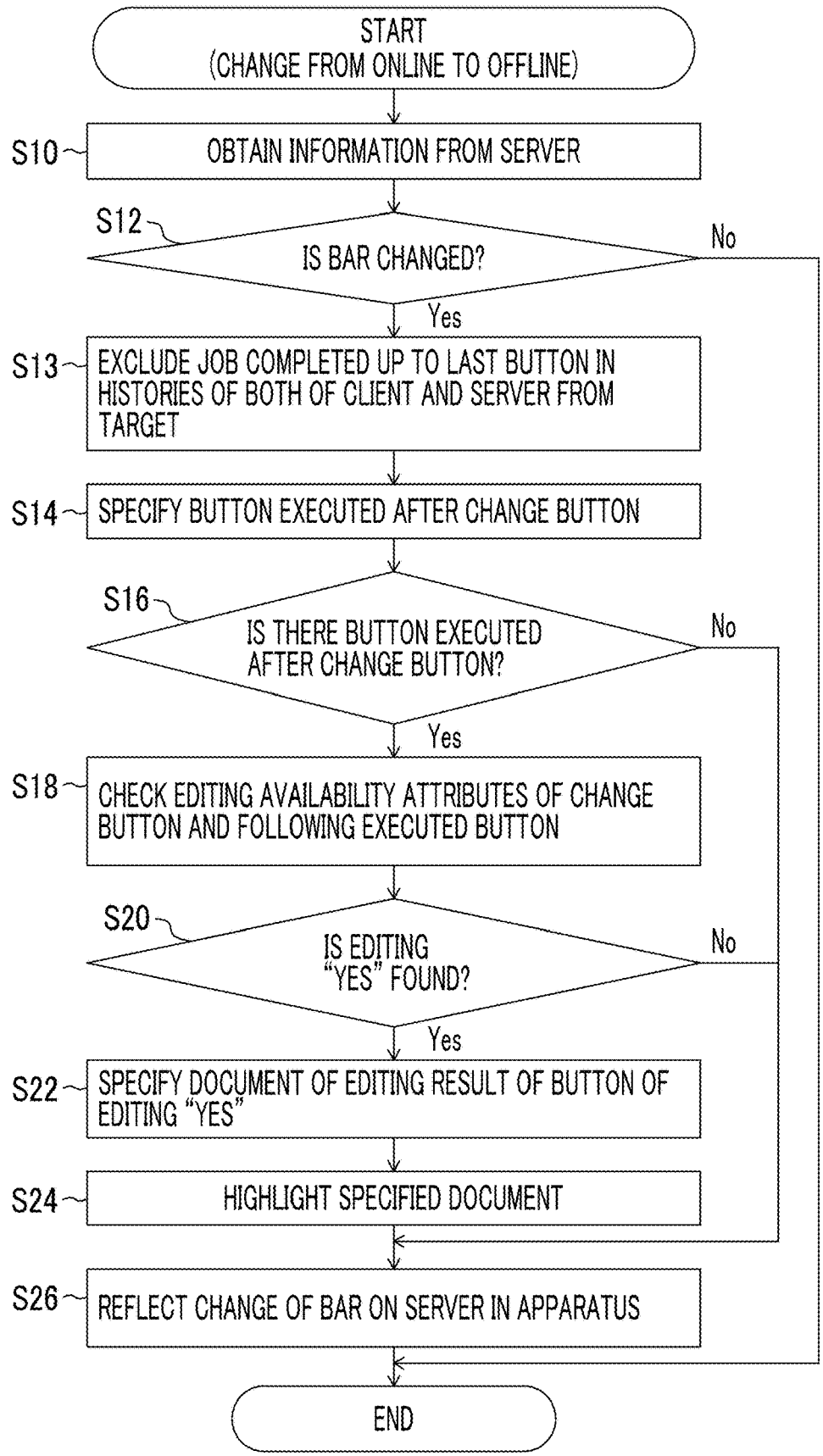
FIG. 8 is a diagram illustrating a processing procedure of notifying a document affected by a change of a flow bar during an offline period.

Next, with reference to FIG. 8, an example of processes of the present exemplary embodiment, which is executed by the processor 102 of the client 100, will be described. This process is implemented, for example, as one of the functions of the document handling application installed in the client 100. The processing procedure in FIG. 8 is processing of notifying of a document processed by the client 100 by using the flow bar 1100 while the client 100 is in an offline state with the server 200. The procedure in FIG. 8 is executed for each flow bar 1100 installed in the client 100. The flow bar 1100 which is a target of the procedure in FIG. 8 is called as a target bar.

The procedure in FIG. 8 is executed when the processor 102 detects that the server 200 is changed from an offline state to an online state. In this procedure, the processor 102 first obtains the button management information 210, the bar management information 220, and the history information 230 from the server 200 (S10). At this time, among the button management information 210, the bar management information 220, and the history information 230, information on the flow bar 1100 having the same bar ID as the target bar, information on each button included in the flow bar 1100, and records of a history having the bar ID are obtained. The button management information 110 and the bar management information 120 in the client 100 are updated to a state in which the information obtained at this time is reflected.

Next, the processor 102 determines whether or not the target bar is changed during the offline period based on the information obtained in S10 (S12). That is, in a case where a last update date and time corresponding to the same bar ID in the bar management information 220 in the server 200 is later than a last update date and time of the target bar in the bar management information 120 in the client 100, it is determined that the target bar is changed.

In a case where the determination result in S12 is No, the target bar itself is not changed, and there is no need to return the editing result of the document by using the target bar. Therefore, in this case, the processes in FIG. 8 are terminated.

In a case where the determination result in S12 is Yes, the processor 102 compares the history information 130 in the client 100 with the history information 230 obtained from the server 200 in job units. A job of which execution of the last button of a flow bar is completed in both of the history information 130 and 230 is excluded from a target of the subsequent process (S13). This is because for such a job, a workflow indicated by the flow bar is already completed in the entire system including the client 100 and the server 200. On the other hand, in a case where a job of which execution of the last button of the flow bar is not completed is found in the history information 230 of the server 200, the job becomes a target of the subsequent process.

Next, the processor 102 specifies a button having a change (that is, the offline period immediately before shifting to an online state this time) during a current offline period among buttons of the target bar. The changed button is a button of which corresponding command or setting content is changed, a button added to the target bar, or a button deleted from the target bar. Hereinafter, the changed button is referred to as a "change button". In a case where the change button is a button deleted from the target bar during the current offline period, the change button does not exist on the target bar after the change. The addition or deletion of the button to the target bar can be found by comparing a bar definition of the target bar in the client 100 with a bar definition of the target bar obtained from the server 200. Further, in a case where a last update date and time of the button in the button management information 210 of the server 200 is newer than a last update date and time of the button included in the bar definition of the target bar in the button management information 110 of the client 100, it can be determined that a command content or a setting content of the button is changed.

The steps after S14 described below are executed for each job remaining as a process target in S13. That is, in the steps described below, the following steps are executed by checking the record group including the job ID in the history information 130 for each job as the process target.

The processor 102 specifies, among the buttons in the target bar, an executed button of which order is later than the change button (S14). In S14, it is checked whether or not there is a record indicating an execution history of the button of which order is later than the change button among the records including the bar ID of the target bar in the history information 130 in the client 100. In a case where there is such a record, the button indicated by the record is specified as an executed button of which order is later than the change button in S14. The button specified in S14 is called an "executed button".

Next, the processor 102 determines whether or not the executed button corresponding to the condition in S14 is found (S16). The execution result of the button of which order is later than the change button is affected by the change of the change button. In a case where there is an executed button of which order is later than the change button, checking is necessary since there is a possibility that the document is edited by the execution of the executed button. On the other hand, the execution result of the button of which order is earlier than the change button is not affected by the change of the change button, so that such checking is unnecessary.

In a case where the determination result in S16 is No, the processor 102 skips S18 to S24 and reflects the change of the target bar obtained from the server 200 on information of the target bar in the bar management information 120 in the client 100 (S26). Accordingly, the target bar in the client 100 is synchronized with the latest state of the target bar on the server 200.

In a case where the determination result in S16 is Yes, for the change button among the buttons in the target bar and each executed button of which order is later than the change button in the target bar, the processor 102 searches for one having a value of the attribute of "editing availability" with "yes" in the button management information 210 (S18). It is determined whether or not any one of the buttons has the value of the attribute of "editing availability" with "yes" (S20).

In a case where there is a button having a value of the attribute of "editing availability" with "yes" among the change button and the subsequent executed button, it means that there is a document which further receives editing after a command corresponding to a state of the change button before the change is executed. Since the editing result of the document does not go through the execution of the command corresponding to the changed state of the change button, in some cases, the editing result is not valid in terms of the changed workflow. In order to search for such a document, S20 is executed.

In a case where the determination result in S20 is No, the processor 102 reflects the change of the target bar obtained from the server 200 in the information of the target bar in the bar management information 120 in the client 100 (S26). Accordingly, the target bar in the client 100 is synchronized with the latest state of the target bar on the server 200.

In a case where the determination result in S20 is Yes, the processor 102 specifies a document of the editing result corresponding to the change button and the executed button of which the value of the attribute "editing availability" found in S20 is "yes" (S22). In this step, from the record of the change button and the executed button of which order is later than the change button in the history information 130 (see FIG. 7), a document ID corresponding to the change button and the executed button having the value of the attribute "editing availability" with "yes" may be specified.

Next, the processor 102 highlights an icon of the document specified in S22 among the icons 1012 and 1014, and the like of the respective documents in the main pane 1010 of the displayed window 1000 in a display mode capable of being distinguished from the icons of the other documents not specified (S24). Further, the processor 102 reflects the change of the target bar obtained from the server 200 in the information of the target bar in the bar management information 120 in the client 100 (S26).

Figure 9:
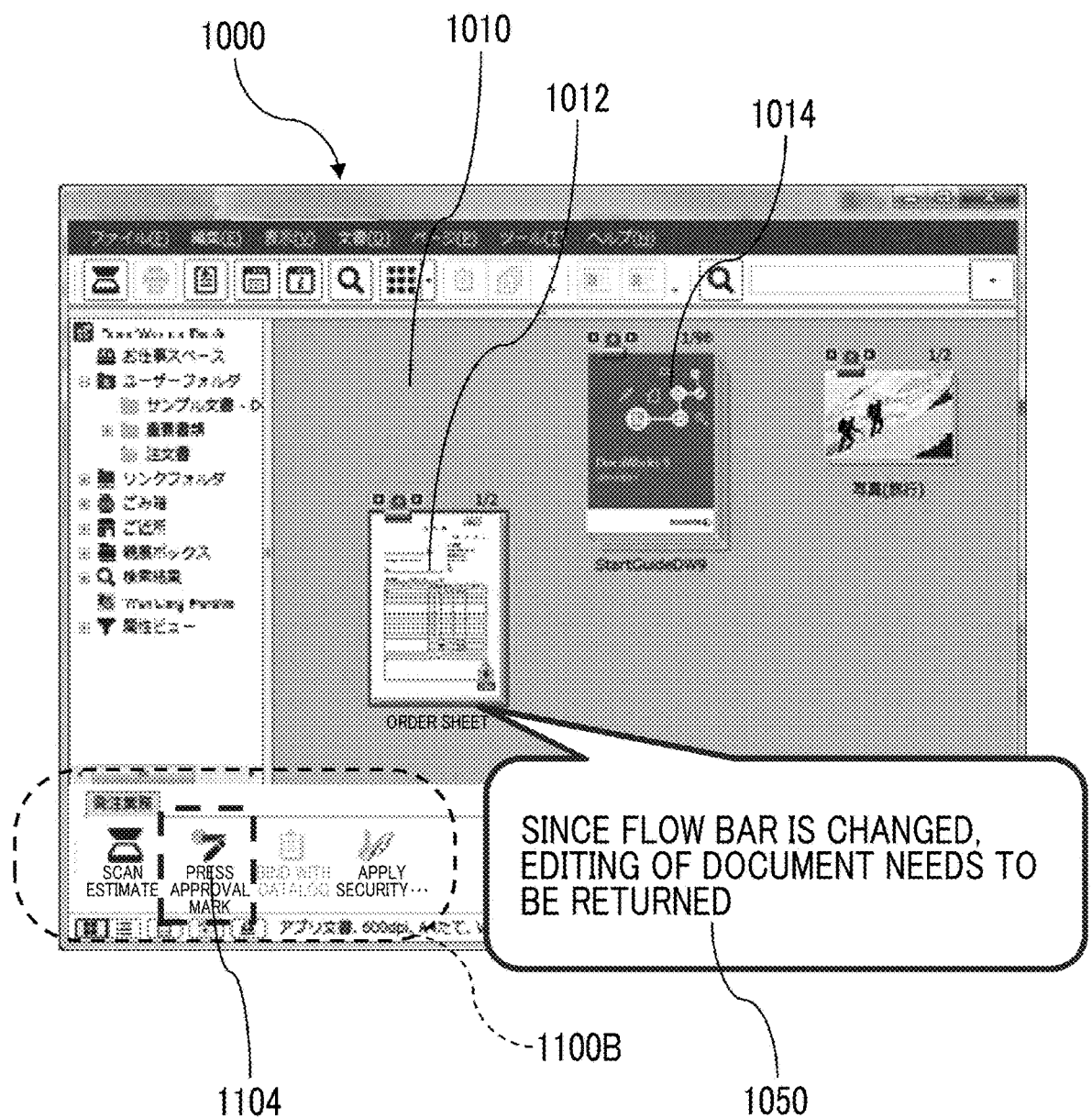
FIG. 9 is a diagram illustrating a UI screen for notifying the document affected by the change of the flow bar during the offline period.

Hereinbefore, the procedure in FIG. 8 is described above. FIG. 9 illustrates an example of the window 1000 displayed on a screen of the client 100 in steps S24 and S26 in the procedure in FIG. 8.

The example in FIG. 9 is an example in a case where the flow bar 1100A illustrated in FIG. 2 is changed to the flow bar 1100B by adding the button 1104. In the window 1000 illustrated in FIG. 9, the icon 1012 of the document specified in S22 is highlighted by a thick frame line. In addition, a message field 1050 is displayed in a pop-up type in association with the icon 1012. The message field 1050 displays a message indicating that editing of the document needs to be returned since the flow bar is changed. The window 1000 displays the flow bar 1100B to which the button 1104 is added.

As described above, according to the processing procedure in FIG. 8, the highlighting indicates a document of which an editing result by the change in the flow bar 1100 during the offline period needs to be returned among the documents displayed in the window 1000, to the user.

In the above example, the document specified in S22 is highlighted in the main pane 1010 of the window 1000, but the display for notifying the specified document is not limited to such highlighting. For example, information for specifying the document may be provided to the user in a method of displaying another window in which information such as a link of indicating the document specified in S22.

Return Process for Editing Result During Offline Period

Next, a modification example of the procedure in FIG. 8 will be described with reference to FIGS. 10 and 11. In the procedure in FIG. 8, the user is only informed of the document of which the editing result by the change of the target bar during the offline period needs to be returned. On the other hand, in this modification example, a process of returning a state of the document to a state before the editing during the offline period is performed is performed.

Figure 10:
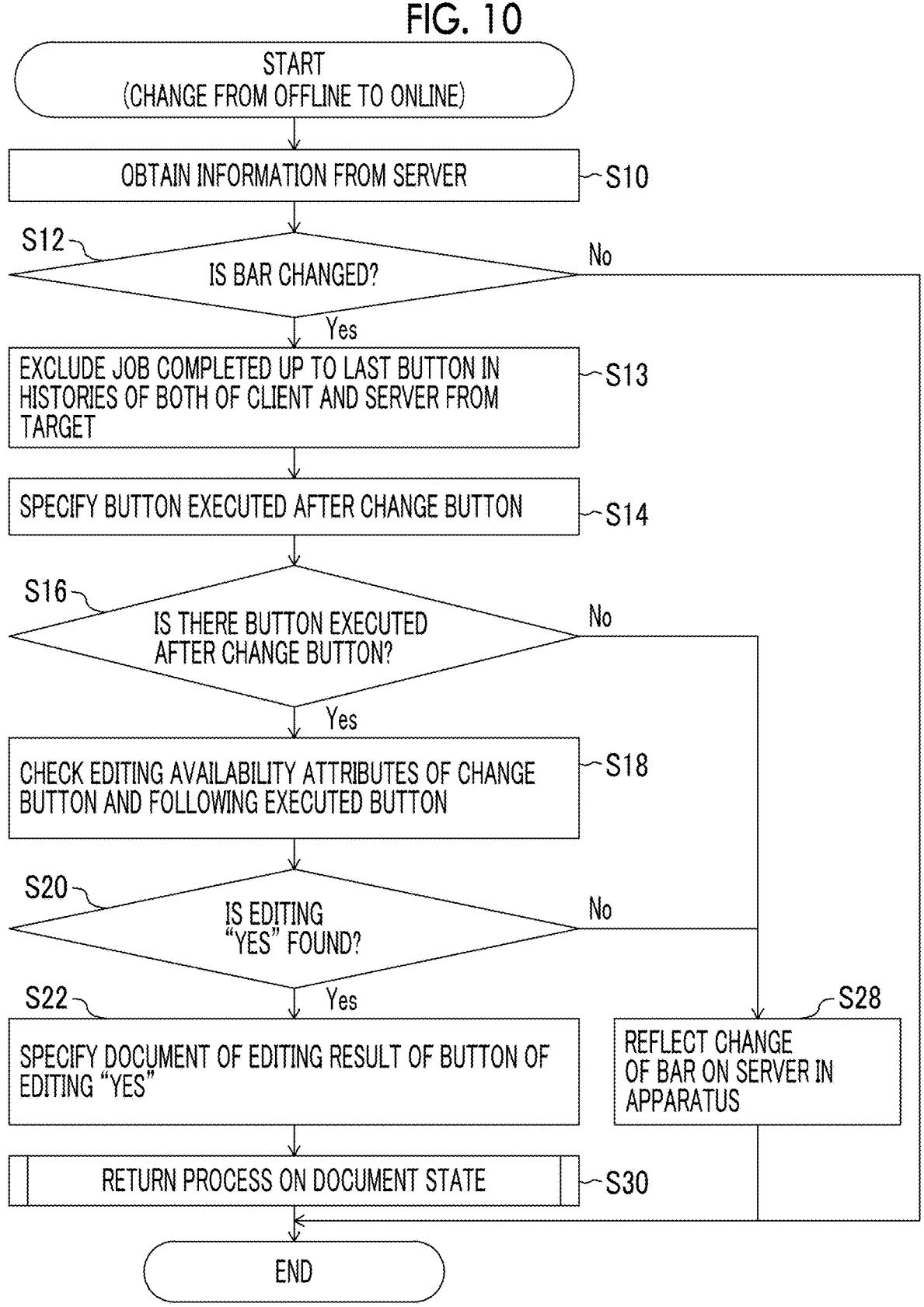
FIG. 10 is a diagram illustrating a processing procedure of returning the document affected by the change in the flow bar during the offline period to an appropriate state.

FIG. 10 is a diagram illustrating an overall procedure of this process. In the procedure in FIGS. 10, S10 to S22 indicate the same processes as the steps having the same reference numerals in the procedure in FIG. 8.

In the procedure in FIG. 10, in a case where the determination result in S20 is No, the processor 102 reflects the change of the target bar obtained from the server 200 in the information of the target bar in the bar management information 120 in the client 100 (S28). On the other hand, in a case where the determination result in S20 is Yes, the processor 102 performs the process in S22. The processor 102 executes a "return process" for each document specified in S22 (S30).

Figure 11:
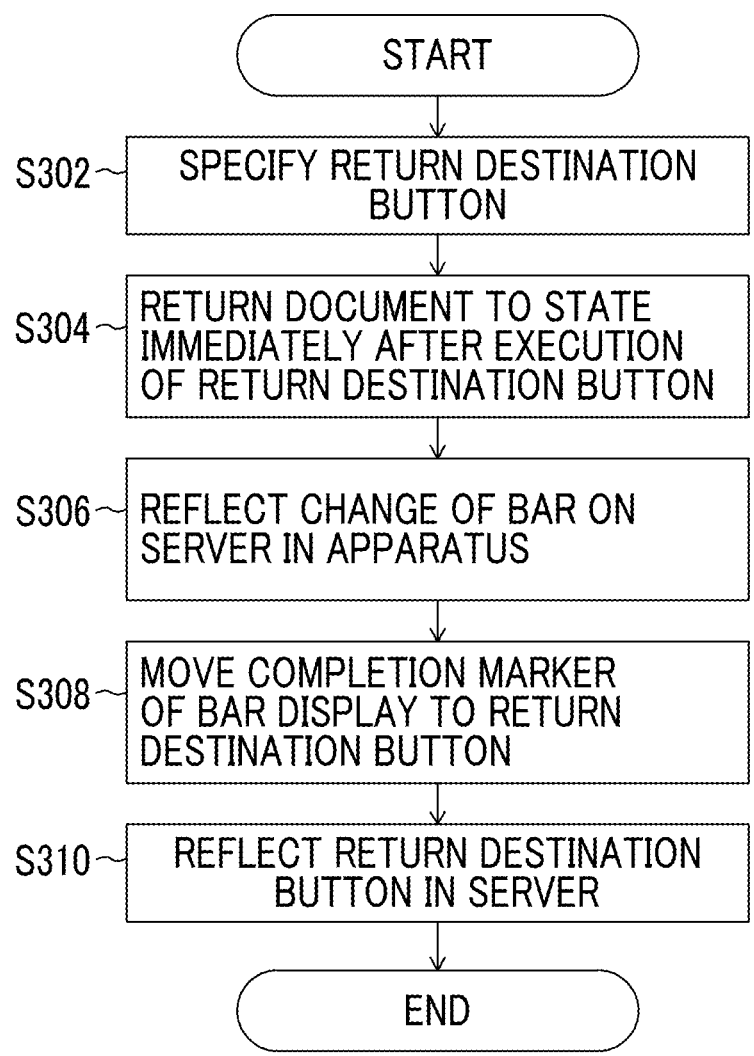
FIG. 11 is a diagram illustrating a detailed procedure of the return process in the procedure in FIG. 10.

FIG. 11 illustrates an example of a detailed processing procedure in S30. In this procedure, a return destination button of the document specified in S22 is specified (S302). In step S302, the processor 102 sets the change button as a starting point, and checks values of "editing availability" of the change button or the executed button in the button management information 110 in the order of arrangement of buttons on the flow bar from the starting point. A button immediately before a button having editing "yes" found first in the process is set as a return destination button. A mark indicating the last one among executed buttons in the arrangement order of the buttons on the target bar is returned to the return destination button. Since the change of the change button affects to the editing of the document and a first button having editing "yes" after the change button is the first, the first button having editing "yes" is returned to an unexecuted state.

In this process, even in a case where the change button (that is, addition, deletion, or the button of which a content is changed) is a deleted button, in a case where the change button has editing "yes", a button immediately before the change button is the return destination button. In a case where a button indicating a process of involving editing of a document is deleted, a flow after the deletion needs the process result of the document without editing, so that it is necessary to return a state of the document before receiving the editing. Further, in a case where the button immediately before the button having editing "yes" first found in the process in S302 is a change button and the change button is a deleted button, there is no change button in the changed flow bar, so that a button before one button of the change button is set as the return destination button.

In a case where a plurality of jobs are executed by using the same target bar during the offline period, the return destination button may be different for each job.

Next, the processor 102 returns a state of the document specified in S22 to a state immediately after the execution of the return destination button (in other words, a state immediately before execution of the "first button having editing "yes"") (S304).

In order to return a document resulting from execution of a certain button on the document to a state before the button is executed, a reverse process of a command indicated by the button may be performed on the document. By performing the rewinding process in button units is performed on the document from the most recently executed button by one button at a time in the reverse order of the execution of the buttons, the document is returned to the state immediately after the execution of the return destination button. Further, as another example, in a case where each record of the history information 130 and 230 records a document of an execution result of the button related to the record (that is, a snapshot at the time of the execution), it is easy to return a state of the document to the state immediately after the execution of the return destination button. In this case, the snapshot of the document recorded in the record of the return destination button may be simply taken out, and the document displayed on the main pane 1010 may be replaced with the snapshot.

Accordingly, the processor 102 deletes, from the history information 130, a record indicating that the button after the return destination button in the job (that is, the job to which the record including the document to be returned belongs) is already executed.

Next, the processor 102 reflects the latest state of the target bar obtained from the server 200 on the target bar in the client 100 (S306). The process in S306 is the same as the process in S26. Next, the processor 102 moves a completion marker displayed on the target bar to a position of the return destination button (S308). The completion marker is a marker (that is, a stamp) indicating the last one of the executed buttons in the arrangement order of the buttons indicated by the flow bar 1100. In a case where the processor 102 displays the flow bar 1100 corresponding to a document selected on the main pane 1010, it is also conceivable that the processor 102 specifies the last executed button of the job from the records in the history information 130, and displays a completion marker on the button. In this case, in a case where the record of the button after the return destination button is deleted from the history information 130, the effect in S308 is automatically obtained.

The processor 102 transmits information on the return destination button specified in S302 to the server 200 (S310). At this time, the information transmitted to the server 200 by the processor 102 includes a job ID of the job and a button ID of the return destination button. The server 200 which receives this information deletes, from records including the job ID in the history information 230, a record indicating that the button of which order is later than the return destination button is executed. As a result, the return destination button for the job is reflected in the server 200.

Although the return process (S30) is automatically executed in the processes in FIGS. 10 and 11, this is only an example. Instead, in a case where the determination result in S20 is Yes, an inquiry of whether or not to perform the return process may be made to the user, and the return process may be executed only in a case where the user instructs execution of the return process in response to the inquiry.

Figure 12:
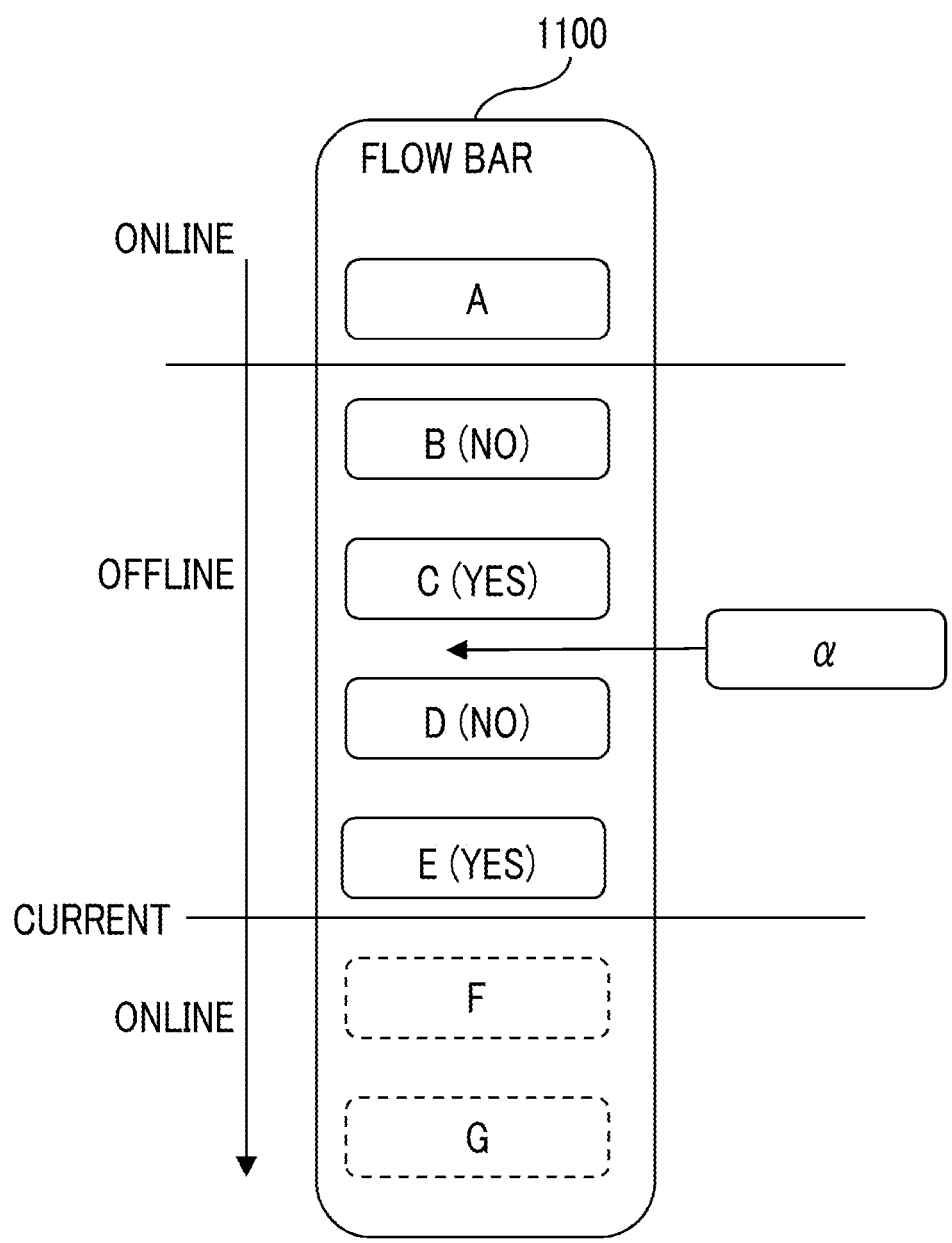
FIG. 12 is a diagram for explaining to which button an executed stage is returned according to addition of a button on a flow bar.

A specific example of the processes in FIGS. 10 and 11 described above will be described with reference to FIG. 12. The flow bar 1100 illustrated in FIG. 12 has buttons A to G arranged in this order. In this example, execution of the button A is completed during an online period, but the client 100 becomes in an offline state with the server 200 after that, and the buttons B to E are executed during the offline period. In FIG. 12, "yes" and "no" illustrated in parentheses next to B, C, D, and E are values of "editing availability" of the buttons. It is assumed that a button α is added between the buttons C and D of the flow bar 1100 during this offline period. It is assumed that the client 100 is returned to the online state with the server 200 at present, that is, at a time at which after the button E is executed and before the button F is executed. At this time, the procedure in FIGS. 10 and 11 is executed by the processor 102.

At this time, while the flow bar 1100 possessed in the client 100 is in a state before the button α is added, the flow bar 1100 possessed by the server 200 is in a state after the button α is added. Therefore, the determination result in S12 in FIG. 10 is Yes. Next, in step S14, by comparing the history information 130 in the client 100 with the history information 230 obtained from the server 200, the processor 102 recognizes that the buttons B to E are executed during the offline period. The added button α is a "change button", and there are executed buttons D and E during the offline period after the change button, so that the determination result in S16 is Yes.

In S18, the processor 102 checks values of the attribute "editing availability" of the change button α and the subsequent executed buttons D and E. In this case, since the value of the attribute "editing availability" of the button E is "yes", the determination result in S20 is Yes. In S22, the processor 102 specifies a document resulting from the editing by the execution of the button E from the history information 130, and executes the process in S30 on the specified document.

In the process in S30, the processor 102 first specifies a return destination button in S302. In the example in FIG. 12, a starting point is the button α which is a button next to the button C immediately before the added button α which is a change button. Search is performed backward from a button at the starting point, and a button immediately before a first button having "yes" as a value of the attribute "editing availability" is set as a return destination button.

For example, in a case where a value of the attribute "editing availability" of the added button α is "no", the first button having "yes" as the value of the attribute "editing availability" after the button α is the button E. Therefore, the return destination button is the button D before one button of the button E. In this case, in S304, the document resulting from the editing by the execution of the button E is returned to a state immediately after the execution of the button D as a return destination, that is, immediately before the execution of the button E. In this case, a destination of a completion marker in S308 is the button D, which is also reflected in the server 200 in S310.

In a case where the value of the attribute "editing availability" of the added button α is "yes", it is determined that the return destination button is the button C in S302. In this case, in S304, the document resulting from the editing by the execution of the button E is returned to a state immediately after the execution of the button C as a return destination. Since the value of the attribute "editing availability" of the button D is "no", the state immediately after the execution of the button C of the document is the same as the state immediately before the execution of the button E of the document. In this case, a destination of a completion marker in S308 is the button C, which is also reflected in the server 200 in S310.

Figure 13:
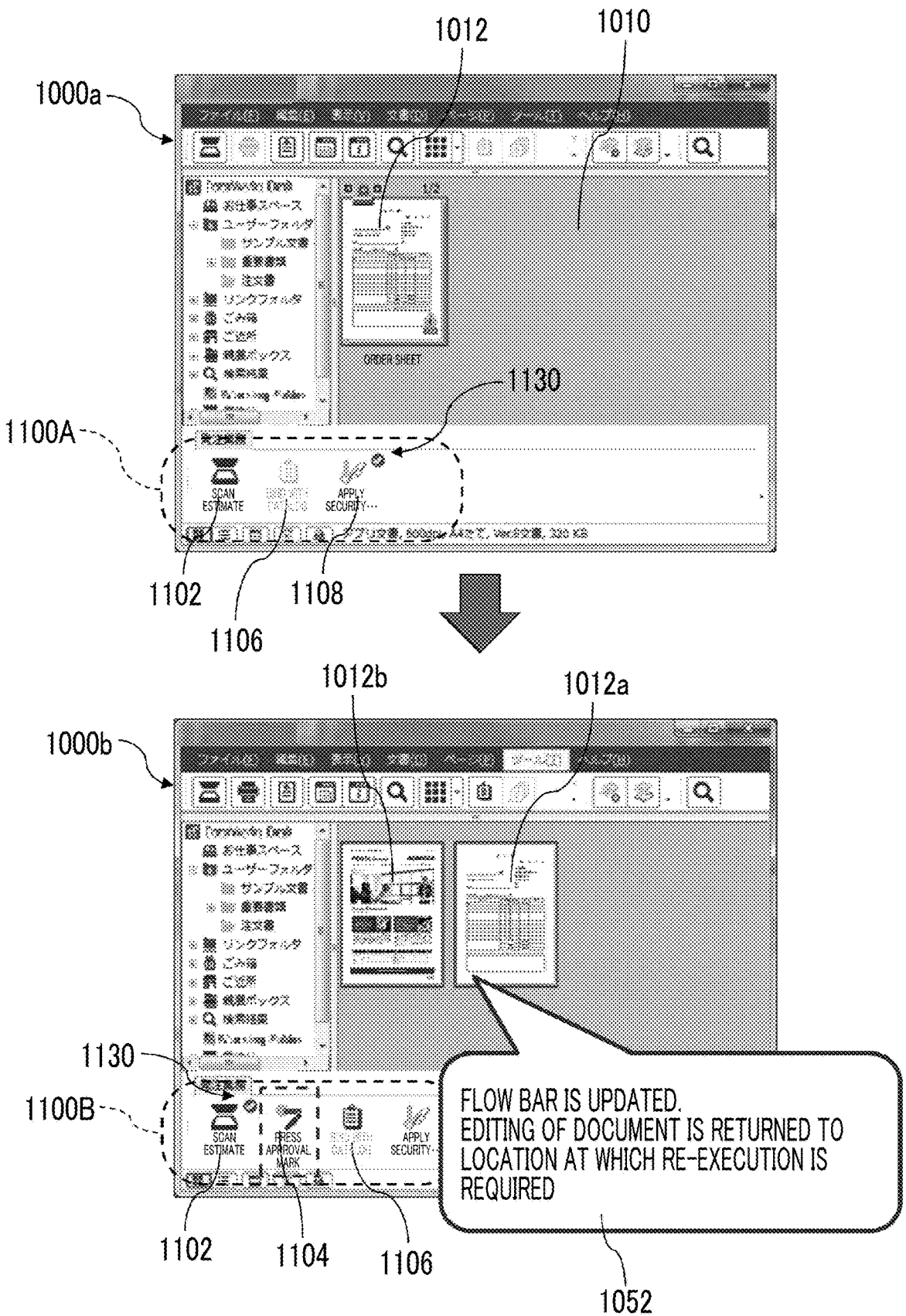
FIG. 13 is a diagram illustrating a change in the UI screen before and after the return process is performed.

FIG. 13 illustrates an example of a change in a UI screen of a document handling application due to the return process (S30). A window 1000a illustrated in FIG. 13 illustrates a state immediately before the client 100 switches from an offline state to an online state, and a window 1000b illustrates a state immediately after the client 100 switches to the online state and executes the return process.

In the window 1000a immediately before the return process, the icon 1012 of a document in the main pane 1010 is in a selected state. A bar ID included in a record group including a document ID of the document is specified in the history information 130, and the flow bar 1100A corresponding to the bar ID is displayed in the window 1000a. The flow bar 1100A has the three buttons 1102, 1106 and 1108 arranged in this order. This flow bar 1100A is during an offline period, and a change corresponding to the flow bar 1100A on the server 200 is not applied. Further, at a time immediately before the return process, the execution is completed up to the last button 1108 of the flow bar 1100A, and a completion marker 1130 is displayed on the right shoulder of the button 1108.

In the example in FIG. 13, the button 1104 is added between the buttons 1102 and 1106 of the flow bar 1100A during the offline period. The added button 1104 is a button for executing a process of "press approval mark", and is for editing contents of a target document. That is, a value of the attribute "editing availability" of the button 1104 is "yes".

In this case, in the return process, the button 1104 is a first button having editing "yes" as viewed from a starting point, and a return destination button is the button 1102 immediately before the button 1104. Therefore, the flow bar 1100B to which the button 1104 is added is displayed in the window 1000b immediately after the return process, and the completion marker 1130 is displayed on the right shoulder of the button 1102 which is a return destination. The user looks at the completion marker 1130, recognizes that the execution up to the button 1102 is completed, and knows that the button 1104 is to be executed next.

Further, the buttons 1106 and 1108 already executed at a time immediately before the return process respectively indicate a process of "bind with catalog" and a process of "apply security". These are all processes for changing the document, and values of the attribute of "editing availability" are "yes". Therefore, the process of returning the document of the execution result of these buttons 1106 and 1108 to an original state is performed. In this example, first, a document secured by the button 1108 (that is, a document of "order sheet" indicated by the icon 1012) is returned to a state before security is applied. Next, the document in the state before the security is applied is returned to a state before being bound by the button 1106. In the illustrated example, the "order sheet" after being bound into one becomes in a state of being divided into the document of "order sheet" of a scan result obtained by executing the "scan estimate" button 1102 and a catalog bound with the document. As a result, the window 1000b after the return process displays an icon 1012a indicating the document of "order sheet" as the scan result of the execution of the button 1102, and is in a state in which an icon 1012b indicating the catalog bound with the icon 1012a.

In this window 1000b, a message field 1052 is displayed in a pop-up type. The message field 1052 displays a message indicating that the flow bar is updated, and that editing of the document is returned to a stage, in which re-execution is required, in the flow bar (that is, immediately after the return destination button).

By looking at the message field 1052, the user knows that the main pane 1010 of the window 1000b indicates a state in a case where the process of the button 1102 is completed, and that it is necessary to restart the operation from the button 1104 next.

Automatic Execution of Button After Return Process

In the example of the return process described above, since the completion marker 1130 is returned to the return destination button, it is necessary to execute again a button next to the return destination button.

Meanwhile, some of the buttons in the flow bar 1100 do not require user intervention to execute the button.

For example, a button representing a command of converting a document into a PDF format is one example. Contents of a process of the command executed in a case where the button is pressed are predetermined, and the user does not need to intervene other than pressing the button. Further, a button representing a command of dividing a document in page units is also one example. The user does not need to intervene in a dividing process in page units. In addition, a button representing a process of adding a specific annotation to a specific position in a document is also one example. In a case where the button is pressed, the specific annotation is added at the specific position in the document in accordance with setting contents of the button, so that the user does not need to intervene.

In this manner, for the button which does not require user intervention in execution, the document handling application can be automatically executed after the return process. In a case of performing such automatic execution, the user does not have to manually press the button again.

Conversely, the automatic execution is not applied to a button which requires user intervention in execution. An example of the button which requires user intervention in execution includes a button indicating a command for the user to input a comment on a document. In a case where this button is pressed, the document is opened and an annotation can be input, and the user reads the document and adds the comment that comes to mind as an annotation to the document. Another example of such a button includes a button for displaying a set memo. The display of the memo is performed so as to be read by the user. That is, execution of the button requires user intervention of "read". As still another example, there is a button indicating a command for the user to name and save a document. In a case of executing this button, the user intervenes by inputting a name of the document. As still another example, there is a button representing a command for copying an annotation added to a document to another document designated by the user. In this example, the user intervenes in a form of designating the document to which the annotation is to be copied.

In order to automatically execute the button after the return process, the button management information 110 and 210 include an attribute of "automatic execution validity" as illustrated in FIG. 14. A button which does not require user intervention in execution has a value of the attribute set as "valid", and a button which requires user intervention in execution has a value of the attribute set as "invalid". The value of this attribute is set, for example, by the user who creates the button.

Figure 15:
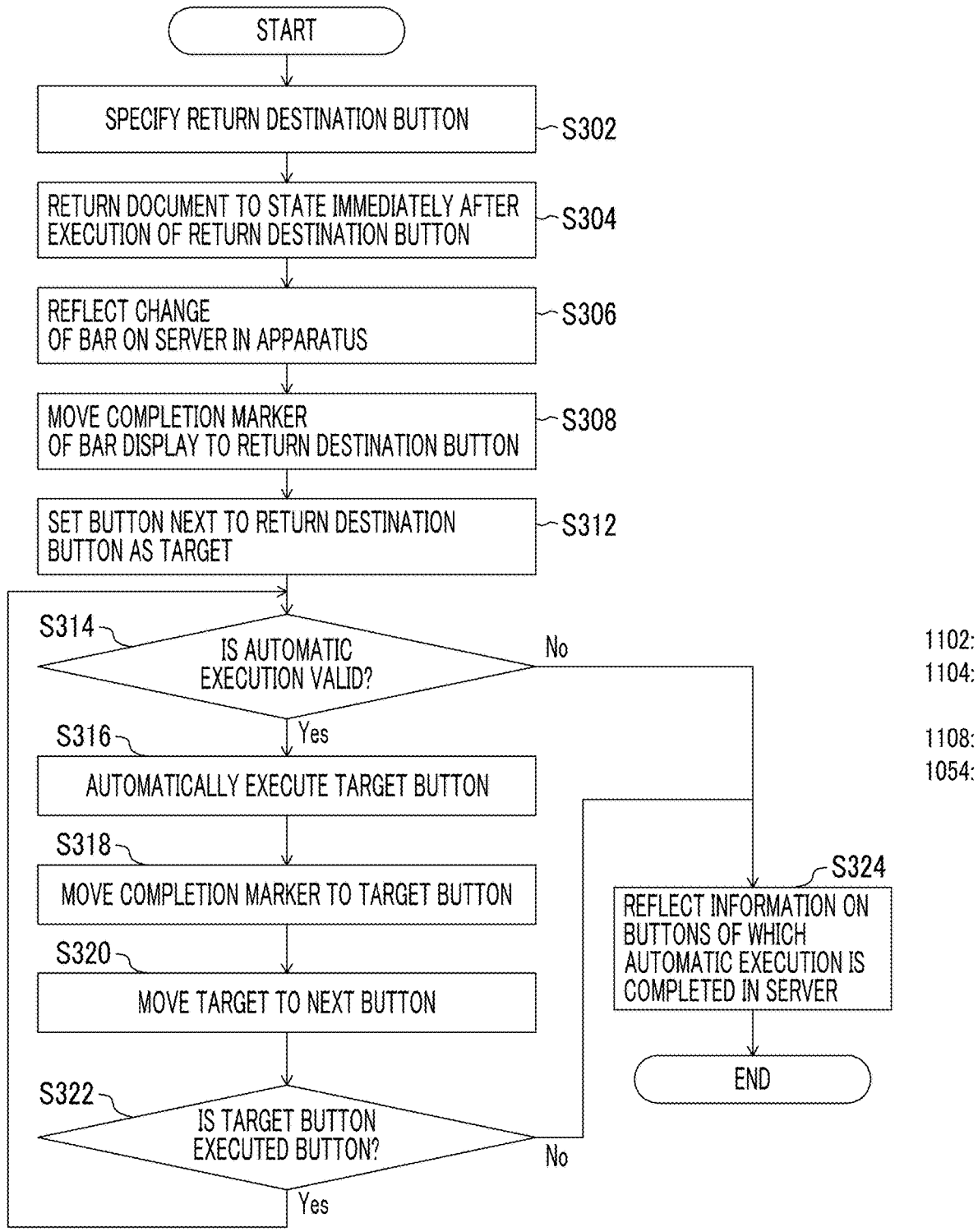
FIG. 15 is another example of the detailed procedure of the return process in the procedure in FIG. 10, and is a diagram illustrating a procedure including automatic execution of a button.

FIG. 15 illustrates a procedure of a return process including automatic execution of a button. The procedure illustrated in FIG. 15 is a second example of the detailed procedure of the return process (S30) in the procedure in FIG. 10. Steps S302 to S308 in the procedure in FIG. 15 represent processes having the same contents as the steps denoted by the same reference numerals in the procedure in FIG. 11.

In the procedure in FIG. 15, after the step S308, the processor 102 executes the steps S312 to S324 instead of the step S310 illustrated in FIG. 11.

That is, after S308, the processor 102 targets a button next to the return destination button in the target bar (S312), and it is determined whether or not a value of the attribute of "automatic execution validity" of the target button in the button management information 110 is "valid" (S314). In a case where the result of this determination is Yes, the processor 102 automatically executes a process represented by the target button (S316). For example, in a case where the target button indicates a process of adding an image of an approval mark set to the button at a predetermined position of the document, the image of the approval mark is added to the predetermined position of the document returned immediately after the execution of the return destination button. Further, the processor 102 adds a record of a history indicating that the target button is executed to the history information 130, and moves a position of the completion marker 1130 to the target button (S318). The processor 102 sets a button next to the current target button as a new target button in the order in the target bar (S320), and determines whether or not the new target button is a button executed in the job (step S322). In a case where the determination result in S322 is Yes, the processor 102 repeats the processes from S314. In a case where the determination result in S322 is No, the target button is a button which is not yet executed in the job by the user, so that the automatic execution is not performed. In this case, the processor 102 proceeds to S324.

In a case where the processes from S314 to S322 are repeated while moving the target button one by one, the determination result in S314 or S322 becomes No. In this case, the processor 102 transmits the record of the execution history of each button automatically executed in S316 to the server 200 (S324).

The server 200 which receives a group of the records reflects the record group in the history information 230. That is, the server 200 searches the history information 230 for a record group including the same job ID as the job ID included in the received record group. Next, a record having the same button ID as the received record group in the record group in the history information 230 found by this search is replaced with the received record group. Further, out of the record group in the history information 230 found by the search, a record indicating an execution history of a button of which order is later than the last button in the received record group is deleted from the history information 230. As a result, the history information 230 in the server 200 indicates a state when the automatic execution on the client 100 side is completed.

Figure 16:
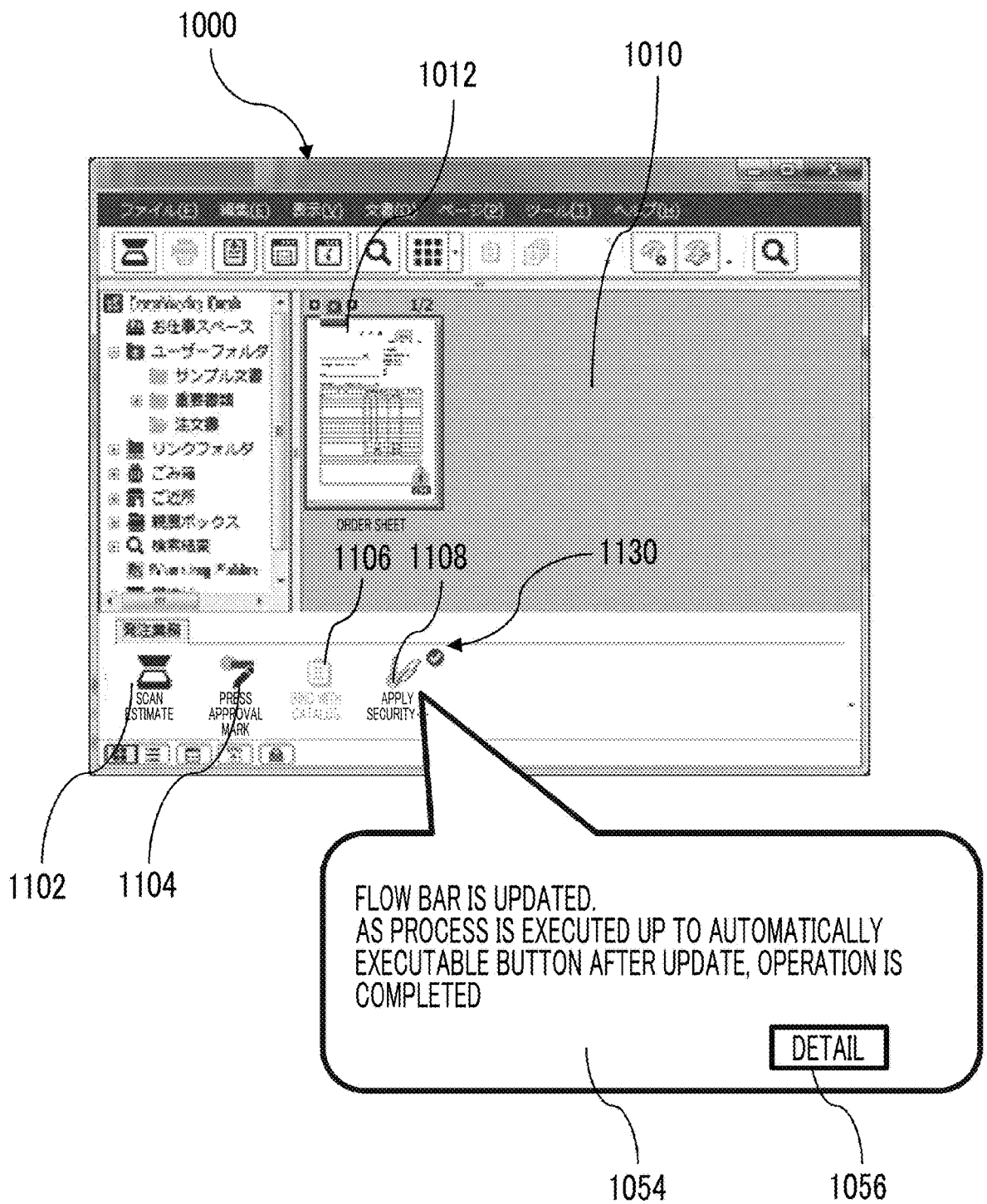
FIG. 16 is a diagram illustrating an example of a UI screen in a case where the automatic execution is performed.
Figure 18:
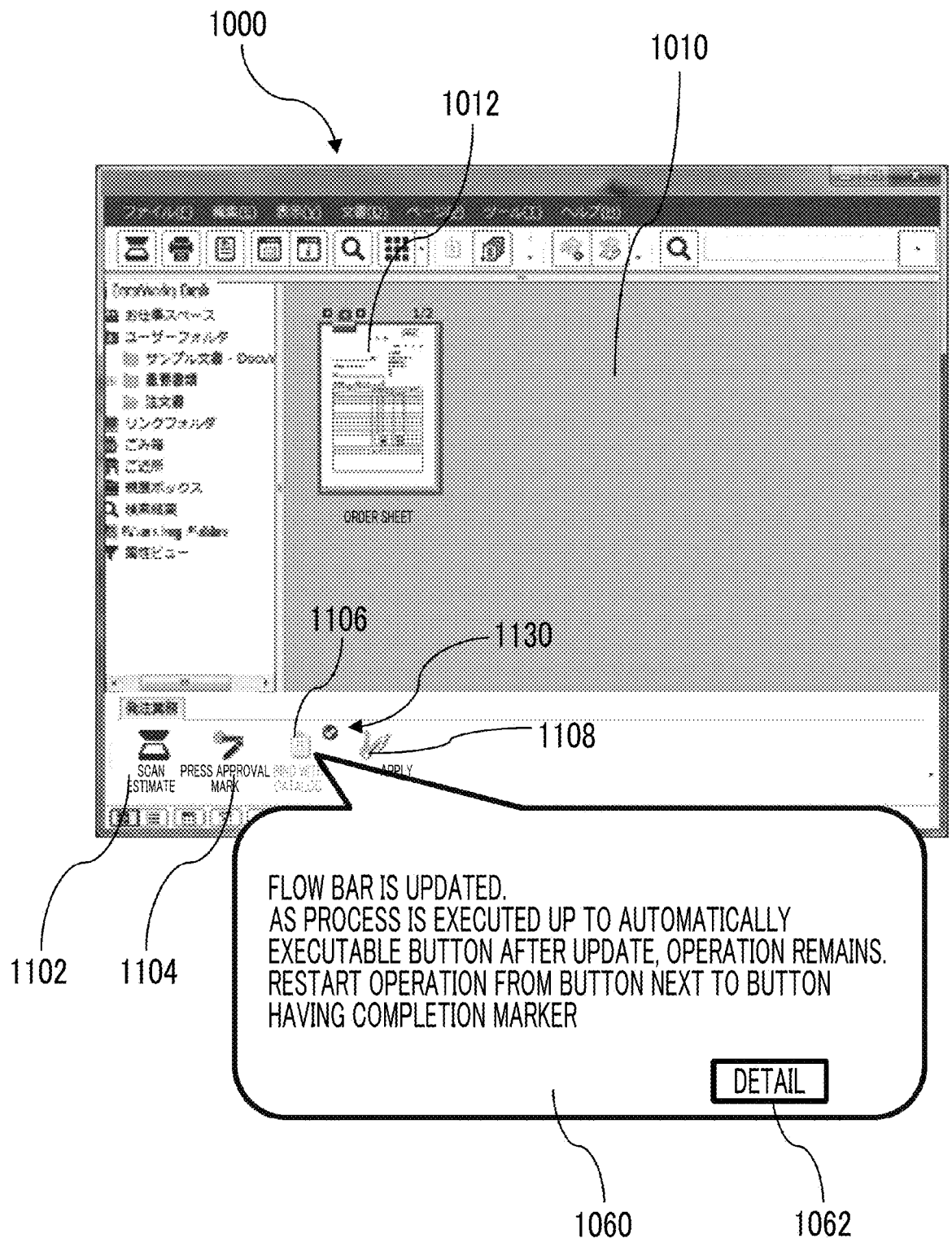
FIG. 18 is a diagram illustrating another example of the UI screen in the case where the automatic execution is performed.

FIGS. 16 and 18 illustrate examples of the window 1000 provided by a document handling application after executing a return process including automatic execution of a button. In all the examples, as in the example illustrated in FIG. 13, it is assumed that the window 1000a illustrated in FIG. 13 is displayed before the execution of the return process, and the button 1104 is added to the flow bar 1100A during the offline period.

The example in FIG. 16 is in a case where values of attributes of "automatic execution validity" of all of the added button 1104 and the subsequent buttons 1106 and 1108 are "valid". In this case, after the completion marker 1130 is returned to the button 1102 in S308, the subsequent buttons 1104, 1106, and 1108 are automatically executed. In the window 1000 after the automatic execution, the completion marker 1130 is displayed on the right shoulder of the button 1108. Further, in the main pane 1010 of the window 1000, an icon 1012 of a document obtained as a result of automatically executing processes of pressing an approval mark, binding with a catalog, and applying security in this order is displayed. In this window 1000, a message field 1054 is displayed in a pop-up type. The message field 1054 displays a message indicating that the flow bar is updated and that the execution of the button after the update of the flow bar is completed up to the last button of the flow bar by automatic execution.

In the message field 1054, a detail button 1056 is illustrated. In a case where the user presses the detail button 1056, the processor 102 displays a detail screen illustrating contents of the update of the flow bar. FIG. 17 illustrates display contents of the detail screen. The detail screen illustrated in FIG. 17 illustrates, for each button in the order included in the flow bar, an image of the button, a change history, and a history of automatic execution. Among the image, the change history, and the history of automatic execution, the change history indicates whether or not the button is changed by the current update of the flow bar, and indicates a type of change in a case where the button is changed. For example, a value of the change history of the first button "scan estimate" is "no change", while the second button "press approval mark" is the one added in this update and a value of the change history is "added". In a field of the history of automatic execution, a value of "unnecessary" is displayed in a case where the order of the button in the flow bar is before the return destination button. In a case where the order of the button is later than the return destination button, and the button is automatically executed, a value of "automatically executed" is displayed in the field of the history of automatic execution. In the example in FIGS. 16 and 17, "automatically executed" is displayed for the second to last fourth buttons of the flow bar. The user knows which button is automatically executed by looking at the detailed display.

In the example in FIG. 18, the added button 1104 and the next button 1106 have the attribute "automatic execution validity" with "valid", but the last button 1108 has a value of the attribute "automatic execution validity" with "invalid", in some cases. In this case, after the completion marker 1130 is returned to the button 1102 in S308, the buttons 1104 and 1106 are automatically executed, but the last button 1108 is not automatically executed. In the window 1000 after this automatic execution illustrated in FIG. 17, the completion marker 1130 is displayed on the right shoulder of the last button 1106 automatically executed. Further, in the main pane 1010 of the window 1000, the icon 1012 of a document obtained as a result of automatically executing processes of pressing an approval mark, and binding with a catalog in this order is displayed. The document is not secured. In this window 1000, a message field 1060 is displayed in a pop-up type. In the message field 1054, a message indicating that the flow bar is updated, and that the button is automatically executed but there is remaining work before the flow is completed, so that the work is to be resumed from a button next to the button having the completion marker 1130 is displayed.

In a case where the user presses the details button 1062 in the message field 1060, the processor 102 displays a details screen (see FIG. 19) indicating contents of the update of the flow bar. The detail screen illustrated in FIG. 19 differs from the example illustrated in FIG. 17 only in contents of a history of automatic execution of the fourth button. That is, in this example, since the fourth button is not automatically executed, a value of the history of automatic execution is "need to be manually executed". By looking at this detailed display, the user knows that the fourth button is not executed automatically and that it is necessary to manually press the button.

In a case where the button is automatically executed according to the procedure in FIG. 15, for example, when the determination result in S314 or S322 is No, the processor 102 may display a document obtained as a result of the series of automatic executions on a screen, and may inquire of the user whether or not the document is acceptable. In a case where the user replies to the inquiry that the document is acceptable, the processor 102 validates the series of automatic executions. In this case, a record of the history of automatic execution remains in the history information 130 and 230 as valid, and the document obtained as a result of the automatic execution is stored in the client 100 or the server 200 as valid. Conversely, in a case where the user replies to the inquiry that the document is unacceptable, the processor 102 deletes the record of the history of the series of automatic executions from the history information 130 and returns a state of the document to a state immediately after execution of the return destination button (that is, a state before the series of automatic executions of the buttons is performed). In this case, the state immediately after the execution of the return destination button is also reflected on the server 200.

Another Example of Processing Procedure

In the above-described example, the process of returning the execution state of the button in the flow bar to the state immediately after the execution of the return destination button regardless of whether or not the attribute of "editing availability" of the change button is editing "yes" is executed (hereinafter, referred to as "rework process"). Meanwhile, this is only an example.

As another example, FIG. 20 illustrates a procedure of executing such a rework process only in a case where the attribute of "editing availability" of the change button is editing "yes". In FIG. 20, steps in which the same content processes as steps in the procedure in FIG. 8 are performed are denoted by the same reference numerals.

In the procedure in FIG. 20, in a case where the determination result in S16 is Yes, the processor 102 determines whether or not the attribute of "editing availability" of the change button is editing "yes" (S40). In a case where the result of this determination is No, the rework process is not executed, and the change of the target bar obtained from the server 200 is reflected in the information of the target bar in the bar management information 120 in the client 100 (S26). On the other hand, in a case where the determination result in S40 is Yes, the processor 102 executes the rework process illustrated in S42 and S44. That is, the processor 102 specifies a button having editing "yes" among the executed buttons after the change button in the arrangement order in the flow bar, and specifies a document of the execution result of the specified button. The specified documents are returned to a state immediately before the execution of the change button (that is, a state immediately after the execution of the button immediately before the change button) (S42). Further, the processor 102 moves a position of the completion marker 1130 to a button immediately before the change button, and deletes a record of the history of each button after the change button in the history information 130 (S44). The processor 102 reflects the change of the target bar obtained from the server 200 in the information of the target bar in the bar management information 120 in the client 100 (S26).

The procedure in FIG. 20 is one modification example of the procedure illustrated in FIGS. 10 and 11. The procedure illustrated in FIG. 8 may be modified in the same manner as the procedure illustrated in FIG. 20 with respect to the procedure illustrated in FIGS. 10 and 11.

Further, the exemplary embodiment described above has a case where a partial function (for example, an individual button in the flow bar 1100) included in a certain function (for example, the flow bar 1100) is changed as a target. Meanwhile, for example, in the flow bar 1100 including only a single button, the processing procedure described in the above exemplary embodiment is applicable even in a case where processing contents of a command indicated by the button are changed. That is, even in a case where the single function is changed, in the same manner as in the above exemplary embodiment, it is possible to display information for specifying data such as a document processed by the function before the change or to return the data of the document or the like to a state before the process by the function is performed. In this case, in a case where the attribute of "automatic execution validity" of the function is "valid", the process by the function may be automatically executed on the data returned to the state before the process by the function before the change is performed on the data after the change.

The exemplary embodiments described above are merely exemplary. Various modification examples may be made within the scope of the exemplary embodiment of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to
perform communication with another apparatus to receive a change in a function of processing data performed in the other apparatus;
cause the change to be reflected in the function of the information processing apparatus;
execute a process related to a first function of the information processing apparatus on first data in accordance with an instruction from a user, during a period in which communication with the other apparatus is not performed;
display information for specifying the first data in a case where a change in the first function is received from the other apparatus when communication with the other apparatus is performed after executing the process related to the first function on the first data; and
execute a return process of returning the first data to a state before execution of the process related to the first function in a case where the change in the first function is received from the other apparatus when communication with the other apparatus is performed after executing the process related to the first function on the first data, wherein after executing the process related to the first function on the first data, when communication with the other apparatus is performed, an inquiry is made to a user as to whether or not to return a state of the first data in a case where the change in the first function is received from the other apparatus, and the return process is executed in a case where the user instructs to return.

2. The information processing apparatus according to claim 1,
wherein the processor is configured to
execute the process related to the first function, in which the change is reflected, on the first data after the return process.

3. The information processing apparatus according to claim 1,
wherein the first function includes a plurality of partial functions of which order is defined,
the change in the first function is a change or deletion of any one partial function of the plurality of partial functions constituting the first function, or an addition of a partial function to the first function, and
the processor is further configured to
execute a return process of returning the first data to a state when a partial function satisfying a predetermined condition after a partial function immediately before the partial function changed, deleted, or added by the change in the first function in the order in a case where the change in the first function is received from the other apparatus when communication with the other apparatus is performed after executing one or more of the partial functions during the period.

4. The information processing apparatus according to claim 3,
wherein an editing availability attribute is set for each of the partial functions, and the editing availability attribute is an attribute indicating whether or not there is a possibility that the first data is edited by execution of the partial function, and
the predetermined condition is a partial function immediately before a first partial function having the editing availability attribute indicating a possibility of being edited in the order among the partial functions after the partial function immediately before the partial function changed, deleted, or added by the change in the first function.

5. The information processing apparatus according to claim 3,
wherein whether or not to allow automatic execution of the partial function after the return process is set for each partial function, and
the processor is configured to
perform an automatic execution process of executing each partial function after the partial function changed, deleted, or added by the change in the order until reaching any one of a partial function set not to allow automatic execution or a partial function not executed, among the plurality of partial functions constituting the first function after the change, on the first data after the return process.

6. The information processing apparatus according to claim 4,
wherein whether or not to allow automatic execution of the partial function after the return process is set for each partial function, and
a processor configured to
perform an automatic execution process of executing each partial function after the partial function changed, deleted, or added by the change in the order until reaching any one of a partial function set not to allow automatic execution or a partial function not executed, among the plurality of partial functions constituting the first function after the change, on the first data after the return process.

7. The information processing apparatus according to claim 1,
wherein whether or not to allow automatic execution of the partial function after the return process is set for each partial function, and
a processor configured to
perform an automatic execution process of executing each partial function after the partial function changed, deleted, or added by the change in the order until reaching any one of a partial function set not to allow automatic execution or a partial function not executed, among the plurality of partial functions constituting the first function after the change, on the first data after the return process.

8. The information processing apparatus according to claim 5,
wherein the first data after the automatic execution process is displayed, whether or not to accept the displayed first data is inquired to the user, and in a case where a response of acceptance is received from the user, the first data after the automatic execution process is stored as valid data.

9. The information processing apparatus according to claim 6,
wherein the first data after the automatic execution process is displayed, whether or not to accept the displayed first data is inquired to the user, and in a case where a response of acceptance is received from the user, the first data after the automatic execution process is stored as valid data.

10. The information processing apparatus according to claim 7,
wherein the first data after the automatic execution process is displayed, whether or not to accept the displayed first data is inquired to the user, and in a case where a response of acceptance is received from the user, the first data after the automatic execution process is stored as valid data.

11. The information processing apparatus according to claim 3,
wherein the processor is further configured to
record the executed partial function in a case where one or more of the plurality of partial functions of the first function are executed in accordance with an instruction from the user;
perform a display capable of specifying a partial function to be executed next by the instruction of the user in the order, based on the record; and
perform a display capable of specifying a partial function next to the partial function satisfying the predetermined condition after the partial function immediately before the partial function changed, deleted, or added by the change in the first function in the order, as a partial function to be executed next by the instruction of the user in the order in a case where the return process is performed.

12. The information processing apparatus according to claim 4,
wherein the processor is further configured to
record the executed partial function in a case where one or more of the plurality of partial functions of the first function are executed in accordance with an instruction from the user;
perform a display capable of specifying a partial function to be executed next by the instruction of the user in the order, based on the record; and
perform a display capable of specifying a partial function next to the partial function satisfying the predetermined condition after the partial function immediately before the partial function changed, deleted, or added by the change in the first function in the order, as a partial function to be executed next by the instruction of the user in the order in a case where the return process is performed.

13. The information processing apparatus according to claim 1,
wherein the processor is further configured to
record the executed partial function in a case where one or more of the plurality of partial functions of the first function are executed in accordance with an instruction from the user;
perform a display capable of specifying a partial function to be executed next by the instruction of the user in the order, based on the record; and
perform a display capable of specifying a partial function next to the partial function satisfying the predetermined condition after the partial function immediately before the partial function changed, deleted, or added by the change in the first function in the order, as a partial function to be executed next by the instruction of the user in the order in a case where the return process is performed.

14. The information processing apparatus according to claim 5,
wherein the processor is further configured to
record the executed partial function in a case where one or more of the plurality of partial functions of the first function are executed in accordance with an instruction from the user;
perform a display capable of specifying a partial function to be executed next by the instruction of the user in the order, based on the record; and
perform a display capable of specifying a partial function next to the partial function satisfying the predetermined condition after the partial function immediately before the partial function changed, deleted, or added by the change in the first function in the order, as a partial function to be executed next by the instruction of the user in the order in a case where the return process is performed.

15. The information processing apparatus according to claim 6,
wherein the processor is further configured to
record the executed partial function in a case where one or more of the plurality of partial functions of the first function are executed in accordance with an instruction from the user;
perform a display capable of specifying a partial function to be executed next by the instruction of the user in the order, based on the record; and
perform a display capable of specifying a partial function next to the partial function satisfying the predetermined condition after the partial function immediately before the partial function changed, deleted, or added by the change in the first function in the order, as a partial function to be executed next by the instruction of the user in the order in a case where the return process is performed.

16. The information processing apparatus according to claim 7,
wherein the processor is further configured to
record the executed partial function in a case where one or more of the plurality of partial functions of the first function are executed in accordance with an instruction from the user;
perform a display capable of specifying a partial function to be executed next by the instruction of the user in the order, based on the record; and
perform a display capable of specifying a partial function next to the partial function satisfying the predetermined condition after the partial function immediately before the partial function changed, deleted, or added by the change in the first function in the order, as a partial function to be executed next by the instruction of the user in the order in a case where the return process is performed.

17. The information processing apparatus according to claim 8,
wherein the processor is further configured to
record the executed partial function in a case where one or more of the plurality of partial functions of the first function are executed in accordance with an instruction from the user;
perform a display capable of specifying a partial function to be executed next by the instruction of the user in the order, based on the record; and
perform a display capable of specifying a partial function next to the partial function satisfying the predetermined condition after the partial function immediately before the partial function changed, deleted, or added by the change in the first function in the order, as a partial function to be executed next by the instruction of the user in the order in a case where the return process is performed.

18. A non-transitory computer readable medium storing a program causing a computer to execute a process, the process comprising:
performing communication with another apparatus, and receiving a change in a function of processing data performed in the other apparatus;
causing the change to be reflected in the function of the information processing apparatus;
executing a process related to a first function of the information processing apparatus on first data in accordance with an instruction from a user, during a period in which communication with the other apparatus is not performed; and
displaying information for specifying the first data in a case where a change in the first function is received from the other apparatus when communication with the other apparatus is performed after executing the process related to the first function on the first data; and
execute a return process of returning the first data to a state before execution of the process related to the first function in a case where the change in the first function is received from the other apparatus when communication with the other apparatus is performed after executing the process related to the first function on the first data, wherein after executing the process related to the first function on the first data, when communication with the other apparatus is performed, an inquiry is made to a user as to whether or not to return a state of the first data in a case where the change in the first function is received from the other apparatus, and the return process is executed in a case where the user instructs to return.

\* \* \* \* \*